United States Patent
Matsuda et al.

(10) Patent No.: US 8,424,054 B2
(45) Date of Patent: Apr. 16, 2013

(54) SECRET INFORMATION MANAGEMENT APPARATUS, INFORMATION PROCESSING APPARATUS, AND SECRET INFORMATION MANAGEMENT SYSTEM

(75) Inventors: Nori Matsuda, Tokyo (JP); Mitsuhiro Hattori, Tokyo (JP); Takeshi Yoneda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 292 days.

(21) Appl. No.: 12/920,606

(22) PCT Filed: Mar. 5, 2009

(86) PCT No.: PCT/JP2009/054173
§ 371 (c)(1),
(2), (4) Date: Sep. 2, 2010

(87) PCT Pub. No.: WO2009/113444
PCT Pub. Date: Sep. 17, 2009

(65) Prior Publication Data
US 2011/0016510 A1    Jan. 20, 2011

(30) Foreign Application Priority Data
Mar. 10, 2008    (JP) ................................. 2008-058884

(51) Int. Cl.
*H04L 29/06* (2006.01)

(52) U.S. Cl.
USPC ................................. 726/1; 713/156; 726/21

(58) Field of Classification Search ................ 726/1, 21; 713/156
See application file for complete search history.

(56) References Cited

U.S. PATENT DOCUMENTS 7,236,956 B1 * 6/2007 Ogg et al. ........................ 705/50
2001/0027519 A1 * 10/2001 Gudbjartsson et al. ........ 713/168
(Continued)

FOREIGN PATENT DOCUMENTS

| CN | 1607484 A | 4/2005 |
|---|---|---|
| CN | 101004745 A | 7/2007 |

(Continued)

OTHER PUBLICATIONS

Miri et al, Using Mediated Identity-Based Cryptography to Support Role-based Access Control, Information Security 7th International Conference, Sep. 2004, pp. 245-256.*

(Continued)

*Primary Examiner* — Michael Pyzocha
(74) *Attorney, Agent, or Firm* — Oblon, Spivak, McClelland, Maier & Neustadt, L.L.P.

(57) ABSTRACT

Secret key backup is safely implemented even if a role base access structure in which the access structure is specified using roles is used. An all combination generating unit 107 obtains a backup participating user list 201 which is a list of backup participating users and a list of validated roles validated by the users, and a role base access structure 202 which is a combination of specified roles by which a secret key 205 can be restored, and generates an all combination extracted result which is all combinations of restoration enabling users of the secret key by applying users described in the backup participating user list 201 to the specified role. A same user/role deleting unit 108, etc. deletes a combination showing the same user redundantly, etc. from the all combination extracted result, a general access structure secret distributing unit 114 generates fragments of secret key from the secret key, and distributes the fragments of secret key to the combinations of users from which the redundancy is removed.

15 Claims, 16 Drawing Sheets

U.S. PATENT DOCUMENTS

| | | | |
|---|---|---|---|
| 2004/0208316 A1* | 10/2004 | Wack et al. | 380/44 |
| 2008/0107272 A1* | 5/2008 | Carmeli et al. | 380/278 |
| 2010/0058077 A1 | 3/2010 | Matsuda et al. | |

FOREIGN PATENT DOCUMENTS

| | | |
|---|---|---|
| JP | 2000-286831 | 10/2000 |
| JP | 2002-111659 | 4/2002 |
| JP | 2002-217891 | 8/2002 |
| JP | 2004-246377 | 9/2004 |
| JP | 2007-124032 | 5/2007 |

OTHER PUBLICATIONS

Li et al. The application of security policy to role-based access control and the common data security architecture, computer communication, Dec. 2000, pp. 1584-1593.*

International Search Report issued Jun. 16, 2009 in PCT/JP2009/054173.

D. Nali, et al., "Using Mediated Identity-Based Cryptography to Support Role-Based Access Control", Information Security, vol. 3225, 2004, pp. 245-256 (with an additional page).

Mitsugu Iwamoto, et al., "Optimal Multiple Assignments Based on Integer Programming in Secret Sharing Schemes with General Access Structures", IEICE Transactions on Fundamentals of Electronics, Communications and Computer Sciences, vol. E90-A, No. 1, Jan. 1, 2007, pp. 101-112 (with an additional page).

Kouya Tochikubo, "Efficient Secret Sharing Schemes Realizing General Access Structures", IEICE Transactions on Fundamentals of Electronics, Communications and Computer Sciences, vol. E87-A, No. 7, Jul. 1, 2004, pp. 1788-1797 (with an additional page).

A. Lin, et al., "The application of security policy to role-based access control and the common data security architecture", Computer Communications, vol. 23, No. 17, Nov. 2000, pp. 1584-1593.

Chigusa Kawashima, et al., "A Study on Hierarchical Secret Sharing Schemes Using Product and Concatenated Codes", IEICE Technical Report, vol. 107, No. 209, Aug. 31, 2007, pp. 17-23 (with an additional page).

Adi Shamir, "How to Share a Secret", Communications of the ACM, vol. 22, No. 11, Nov. 1979, pp. 612-613.

David F. Ferraiolo, et al., "Role-Based Access Control", Artech House, 2003, pp. 6-16 (with an additional page).

Schneier, Bruce. *Applied Cryptography*: Protocols, Algorithms and Source Code in C. China Machine Press, $2^{nd}$ Chinese Edition, Sep. 30, 2007, p. 379.

Wang, Jian. "Storage-Optimal Key Sharing with Authentication in Sensor Networks", Journal of Nanjing University of Aeronautics & Astronautics, vol. 38, No. 6, Dec. 2006, pp. 693-696.

Chinese Office Action (with partial English translation) dated Dec. 5, 2012, in counterpart Chinese Appln No. 200980108332.9 (9 pages).

* cited by examiner

Fig. 2

| PARTICIPATING USER NAME | VALIDATED ROLE |
|---|---|
| ⋮ (2011) | ⋮ (2012) |

| PARTICIPATING USER NAME | VALIDATED ROLE |
|---|---|
| UserA | RoleA |
| UserA | RoleB |
| UserB | RoleB |
| UserB | RoleC |
| UserC | RoleC |
| UserD | RoleA |

| COMBINATION NUMBER | RESTRATION ENABLING COMBINATION |
|---|---|
| ⋮ 402 | ⋮ 403 |

202

| COMBINATION NUMBER | RESTRATION ENABLING COMBINATION |
|---|---|
| No.1 | (RoleA, RoleA) |
| No.2 | RoleA AND 2 of (RoleB, RoleC, RoleD) |

| ROLE | ANCESTOR ROLE |
|---|---|
| RoleD | RoleA |
| RoleE | RoleD |
| RoleF | RoleE |

Fig. 8

| PROHIBITED NUMBER | PROHIBITED ROLE COMBINATION |
|---|---|
| ⋮ | ⋮ |
| 802 | 803 |

| PROHIBITED NUMBER | PROHIBITED ROLE COMBINATION |
|---|---|
| No.1 | 2 of (RoleA, RoleB, RoleC) |
| No.2 | 3 of (RoleA, RoleC, RoleD) |

Fig. 10

| COMBINATION NUMBER | RESTORATION ENABLING COMBINATION |
|---|---|
| ⋮ | ⋮ |

Fig. 11

| COMBINATION NUMBER | RESTORATION ENABLING COMBINATION |
|---|---|
| No.1 | UserA@RoleA(RoleA)+UserA@RoleA(RoleA) |
| No.2 | UserA@RoleA(RoleA)+UserD@RoleA(RoleA) |
| No.3 | UserD@RoleA(RoleA)+UserA@RoleA(RoleA) |
| No.4 | UserD@RoleA(RoleA)+UserD@RoleA(RoleA) |
| No.5 | UserA@RoleA(RoleA)+UserA@RoleB(RoleB)+UserB@RoleC(RoleC) |
| No.6 | UserA@RoleA(RoleA)+UserA@RoleB(RoleB)+UserC@RoleC(RoleC) |
| No.7 | UserA@RoleA(RoleA)+UserB@RoleB(RoleB)+UserB@RoleC(RoleC) |
| No.8 | UserA@RoleA(RoleA)+UserB@RoleB(RoleB)+UserC@RoleC(RoleC) |
| No.9 | UserD@RoleA(RoleA)+UserA@RoleB(RoleB)+UserB@RoleC(RoleC) |
| No.10 | UserD@RoleA(RoleA)+UserA@RoleB(RoleB)+UserC@RoleC(RoleC) |
| No.11 | UserD@RoleA(RoleA)+UserB@RoleB(RoleB)+UserB@RoleC(RoleC) |
| No.12 | UserD@RoleA(RoleA)+UserB@RoleB(RoleB)+UserC@RoleC(RoleC) |

Fig. 12

| COMBINATION NUMBER | RESTORATION ENABLING COMBINATION |
|---|---|
| No.2 | UserA@RoleA(RoleA)+UserD@RoleA(RoleA) |
| No.3 | UserD@RoleA(RoleA)+UserA@RoleA(RoleA) |
| No.5 | UserA@RoleA(RoleA)+UserA@RoleB(RoleB)+UserB@RoleC(RoleC) |
| No.6 | UserA@RoleA(RoleA)+UserA@RoleB(RoleB)+UserC@RoleC(RoleC) |
| No.7 | UserA@RoleA(RoleA)+UserB@RoleB(RoleB)+UserB@RoleC(RoleC) |
| No.8 | UserA@RoleA(RoleA)+UserB@RoleB(RoleB)+UserC@RoleC(RoleC) |
| No.9 | UserD@RoleA(RoleA)+UserA@RoleB(RoleB)+UserB@RoleC(RoleC) |
| No.10 | UserD@RoleA(RoleA)+UserA@RoleB(RoleB)+UserC@RoleC(RoleC) |
| No.11 | UserD@RoleA(RoleA)+UserB@RoleB(RoleB)+UserB@RoleC(RoleC) |
| No.12 | UserD@RoleA(RoleA)+UserB@RoleB(RoleB)+UserC@RoleC(RoleC) |

Fig. 13

| COMBINATION NUMBER | RESTORATION ENABLING COMBINATION |
|---|---|
| No.2 | UserA@RoleA(RoleA)+UserD@RoleA(RoleA) |
| No.3 | UserD@RoleA(RoleA)+UserA@RoleA(RoleA) |
| No.7 | UserA@RoleA(RoleA)+UserB@RoleB(RoleB)+UserB@RoleC(RoleC) |
| No.8 | UserA@RoleA(RoleA)+UserB@RoleB(RoleB)+UserC@RoleC(RoleC) |
| No.9 | UserD@RoleA(RoleA)+UserA@RoleB(RoleB)+UserB@RoleC(RoleC) |
| No.10 | UserD@RoleA(RoleA)+UserA@RoleB(RoleB)+UserC@RoleC(RoleC) |
| No.11 | UserD@RoleA(RoleA)+UserB@RoleB(RoleB)+UserB@RoleC(RoleC) |
| No.12 | UserD@RoleA(RoleA)+UserB@RoleB(RoleB)+UserC@RoleC(RoleC) |

Fig. 14

| COMBINATION NUMBER | RESTORATION ENABLING COMBINATION |
|---|---|
| No.2 | UserA + UserD |
| No.3 | UserD + UserA |
| No.7 | UserA + UserB + UserB |
| No.8 | UserA + UserB + UserC |
| No.9 | UserD + UserA + UserB |
| No.10 | UserD + UserA + UserC |
| No.11 | UserD + UserB + UserB |
| No.12 | UserD + UserB + UserC |

Fig. 15

| COMBINATION NUMBER | RESTORATION ENABLING COMBINATION |
|---|---|
| No.2 | UserA + UserD |
| No.3 | UserD + UserA |
| No.7 | UserA + UserB |
| No.8 | UserA + UserB + UserC |
| No.9 | UserD + UserA + UserB |
| No.10 | UserD + UserA + UserC |
| No.11 | UserD + UserB |
| No.12 | UserD + UserB + UserC |

Fig. 16

| COMBINATION NUMBER | RESTORATION ENABLING COMBINATION |
|---|---|
| No.2 | UserA + UserD |
| No.7 | UserA + UserB |
| No.8 | UserA + UserB + UserC |
| No.9 | UserD + UserA + UserB |
| No.10 | UserD + UserA + UserC |
| No.11 | UserD + UserB |
| No.12 | UserD + UserB + UserC |

Fig. 17

| COMBINATION NUMBER | RESTORATION ENABLING COMBINATION |
|---|---|
| No.2 | UserA + UserD |
| No.7 | UserA + UserB |
| No.11 | UserD + UserB |

Fig. 19

| PARTICIPATING USER NAME | VALIDATED ROLE |
|---|---|
| UserA | RoleD |
| UserA | RoleB |
| UserB | RoleB |
| UserB | RoleC |
| UserC | RoleC |
| UserD | RoleA |

Fig. 24

| NAME OF PERMITTED ROLE | CONTENTS OF PERMITTED OPERATION | OBJECT OF PERMITTED OPERATION | PERMITTER 1 | PERMITTER 2 |
|---|---|---|---|---|
| RoleA | BACKUP | SECRET KEY 1 | RoleA | — |
| RoleA | BACKUP | SECRET KEY 1 | RoleB | RoleC |
| RoleA | BACKUP | SECRET KEY 1 | RoleB | RoleD |
| RoleA | BACKUP | SECRET KEY 1 | RoleC | RoleD |
| RoleA | SIGNATURE | SECRET KEY 1 | — | — |
| RoleA | KEY GENERATION | SECRET KEY 1 | RoleB | RoleC |
| RoleA | KEY GENERATION | SECRET KEY 1 | RoleB | RoleD |
| RoleA | KEY GENERATION | SECRET KEY 1 | RoleC | RoleD |

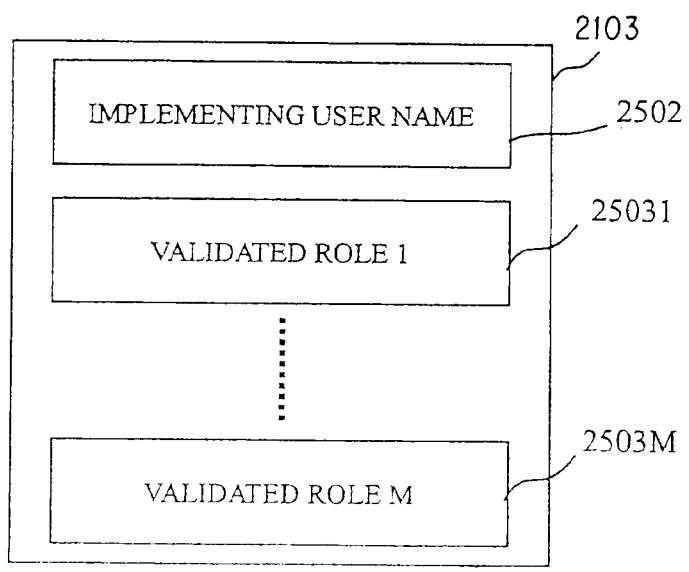

Fig. 25

SECRET INFORMATION MANAGEMENT APPARATUS, INFORMATION PROCESSING APPARATUS, AND SECRET INFORMATION MANAGEMENT SYSTEM

TECHNICAL FIELD

The present invention relates to technique for distributing and managing a secret key.

BACKGROUND ART

The conventional secret key backup method is implemented by using the secret distribution technique.

This is the technique being able to implement safe backup while maintaining the contents of the secret key confidential by dividing the secret key into plural fragments of secret key, and storing each of the plural fragments of secret key by plural administrators (for example, Non-patent document 1).

This method is characterized in that, in addition to specifying the number of divisions N into which the secret key is divided, namely, the number of administrators, it is possible to specify the number of restoration enabling pieces k which shows how many number of fragments of secret key (the administrators) required for restoring the secret key out of the number; and for example, by specifying the numbers as k<N, it is possible to restore the secret key even if one administrator loses a fragment of the secret key.

Further, another secret distribution technique has been proposed to enable to restore the secret key with an arbitrary combination of administrators by devising a delivering method of divided fragments of secret key to the administrators (for example, Patent document 1).

In this method, when there are N administrators P1 through PN, an access structure, which specifies administrators whose fragments of secret key can collectively restore the secret key, is specified.

For example, in order to show that when there are three administrators (P1, P2, P3), the restoration of secret key requires fragments of secret key of two administrators, and one of which is the administrator P1, the access structure is specified as {{P1, P2}, {P1, P3}}.

Then, the secret key is divided into N fragments of secret key by implementing secret distribution of the secret key based on the access structure.

Then, by distributing fragments of secret key to respective administrators, it is possible to restore the secret key only when the administrators of a combination specified by the access structure get together.

On the other hand, Role-Based Access Control (RBAC) has been used in the intra-firm information system of recent years (for example, Non-patent document 2).

This is a mechanism to define roles according to the role of the work or the organizational structure, and to specify the access authority for the role.

Moreover, by forming the role with hierarchical structure, it is possible to inherit the authority.

Further, by registering the user to the role, it is possible to carry out access control of the users.

If change in personnel occurs, it is sufficient to change only the registration of users for the role, so that the method is said to be suitable for the intra-firm information system.

For example, a general manager role and a manager role are created as roles; the authority to settle payment is assigned to the general manager role, the authority to prepare a disbursement voucher is assigned to the manager role. Then, a user of "General Manager Tanaka" is registered to the general manager role, and users of "Manager Suzuki" and "Manager Sato" are registered to the manager role. By this operation, it is possible to carry out access control so that Manager Suzuki or Manager Sato prepares a disbursement slip and General Manager Tanaka is authorized to settle the payment. Further, by making the general manager role inherit the authority of the manager role, it is also possible for General Manager Tanaka to prepare a disbursement. Further, when Takahashi newly becomes a manager, the access authority can be modified easily only by registering Manager Takahashi to the manager role.

Patent document 1: JP 2002-217891A, pp. 5-10
Non-patent document 1: A. Shamir, "How to Share a Secret", Communications of the ACM, v. 22 n. 11, p. 612-613, November 1979
Non-patent document 2: David F. Ferraiolo, D. Richard Kuhn, and Ramaswamy Chandramouli, "Role-Based Access Control", ARTECH HOUSE, INC., 2003, p. 6-16

DISCLOSURE OF THE INVENTION

Problems Solved by the Invention

In the conventional secret key backup method, when there are N administrators of P1 through PN, administrators whose fragments of secret key can collectively restore the secret key, are specified.

However, since the RBAC has been being employed in the intra-firm information system, it is considered that the access structure is going to be specified using roles defined by the RBAC also in case of the secret key backup.

Here, it is general that plural administrators are registered to a role, so that a role may be specified redundantly on the access structure, which is different from the conventional system.

In the conventional secret distribution method, since it is premise that the administrators of P1 through PN specified by the access structure should be separate administrators, it is not considered that the same role is assigned to a combination of the administrators of the access structure.

Therefore, when the same role is specified redundantly, there is a problem that it is impossible to determine how to implement the secret distribution to generate fragments of secret key, and to determine with what kind of combination the fragments of secret key should be delivered to the administrators.

For example, if the secret key can be restored when fragments of secret key possessed by one general manager and two managers are gathered, the access structure is specified as {general manager role, manager role, manager role}.

Then, it is assumed that a fragment of secret key for general manager, a fragment A of secret key for manager, and a fragment B of secret key for manager are generated according to the conventional secret distribution method.

Here, there occurs a problem that with what kind of combination the fragments A and B of secret key for manager should be delivered to the managers.

As a case 1, if both of the fragments A and B of secret key for manager are delivered to Manager Suzuki, Manager Sato, and Manager Takahashi, when General Manager Tanaka and either one of Managers Suzuki, Sato, and Takahashi get together, the secret key can be restored since the fragments of secret key are gathered.

This means that, contrary to the condition that the secret key can be restored only if one general manager and two managers get together, the secret key can be restored by less number of people, which is unfavorable from the viewpoint of security.

As a case 2, it is considered that either of the fragments A and B of secret key for manager is delivered to each manager.

Here, it is assumed that the fragment A of secret key for manager is delivered to Manager Suzuki, and the fragment B of secret key is delivered to Managers Sato and Takahashi.

In this case, the secret key is restorable when three people of General Manager Tanaka, Manager Suzuki, and Manager Sato get together; on the contrary, there occurs a problem that even if three people of General Manager Tanaka, Manager Sato, and Manager Takahashi get together, the secret key cannot be restored, because of an insufficiency of fragments of secret key.

As discussed above, it is a premise that the administrators specified by the conventional access structure should be specified by a combination of different administrators P1 through PN, so that there is a problem that it is impossible to determine how to deliver fragments of secret key if a role is specified redundantly.

One of the main objects of the present invention is to solve the above problems; the present invention aims to implement safely the secret key backup even if the role base access structure in which the access structure is specified using the roles is used.

Means to Solve the Problems

According to the present invention, a secret information management apparatus extracting users who become administrators of two or more pieces of divided secret information to be divided from secret information out of a plurality of users, the secret information management apparatus includes:

a user role information obtaining unit for obtaining user role information showing a role possessed by each of the plurality of users;

a specified role information obtaining unit for obtaining specified role information showing two or more roles as a specified role; and a user extracting unit for comparing the role of each user shown in the user role information with each specified role shown in the specified role information, extracting a user possessing a role matched for each specified role, combining users extracted according to a combination of specified roles, and generating a combination of users who become administrators of divided secret information.

The specified role information obtaining unit sometimes obtains specified role information which redundantly shows a same role for at least two specified roles, and the user extracting unit, when the specified role information redundantly shows the same role, extracts a user for each of at least two specified roles which are the same role, and as well excludes a combination in which a same user is assigned to each of at least two specified roles which are the same role from the combination of users who become the administrators of the divided secret information.

The user role information obtaining unit sometimes obtains user role information showing a user having two or more roles, the secret information management apparatus further includes a simultaneous combination prohibited role information obtaining unit for obtaining simultaneous combination prohibited role information showing two or more roles to which assignment of a same user is prohibited as simultaneous combination prohibited roles; and the user extracting unit extracts a user for each specified role, and as well excludes a combination in which a same user is assigned to at least two specified roles corresponding to the simultaneous combination prohibited roles out of the combinations of users who become administrators of the divided secret information.

The user role information obtaining unit sometimes obtains user role information showing a user possessing an upper level role including one or more other roles as lower level roles, the secret information management apparatus further includes an inclusion relationship information obtaining unit for obtaining inclusion relationship information showing inclusion relationship of the upper level role and the lower level roles, and the user extracting unit, based on the inclusion relationship shown in the inclusion relationship information, when either of the lower level roles is specified as the specified role in the specified role information, derives an upper level role of the lower level role which is the specified role, extracts a user possessing a role which matches the lower level role which is the specified role, and as well extracts a user possessing a role which matches the upper level role of the lower level role which is the specified role by relating to the lower level role.

The secret information management apparatus further includes a simultaneous combination prohibited role information obtaining unit for obtaining simultaneous combination prohibited role information showing two or more roles to which assignment of a same user is prohibited as simultaneous combination prohibited roles, and the user extracting unit, when the lower level role is included in the simultaneous combination prohibited roles, excludes a combination in which a same user is assigned to the upper level role of the lower level role included in the simultaneous combination prohibited roles and either of other specified roles included in the simultaneous combination prohibited roles out of the combinations of users who become the administrators of the divided secret information.

The secret information management apparatus further includes a secret information dividing unit for generating divided secret information based on the combination of users who become the administrators of the divided secret information generated by the user extracting unit.

According to the present invention, an information processing apparatus includes:

an access control policy information obtaining unit for obtaining access control policy information showing a plurality of combinations of an implementer role which is permitted to access secret information, to which an access is limited, and one or more permitter roles which permit the implementer role to access the secret information;

an implementing user information obtaining unit for obtaining implementing user information showing one or more roles possessed by an implementing user who implements access to the secret information, as implementing user roles;

a permitting user information obtaining unit for obtaining permitting user information showing one or more roles possessed by a permitting user who permits the implementing user to access the secret information, as permitting user roles; and a combination extracting unit for extracting a combination of which an implementer role matches the implementing user roles shown by the implementing user information and of which each permitter role matches either of the permitting user roles shown by the permitting user information out of the plurality of combinations shown by the access control policy information.

The implementing user information obtaining unit sometimes obtains implementing user information showing an upper level role including one or more other roles as lower level roles, as the implementing user roles, the information processing apparatus further includes an inclusion relationship information obtaining unit for obtaining inclusion relationship information showing inclusion relationship of the upper level role and the lower level roles, and the combination extracting unit, based on the inclusion relationship shown by the inclusion relationship information, determines if the implementer role corresponds to the lower level role of the implementing user role or not, and when the implementer role corresponds to the lower level role of the implementing user role, determines if each of the permitter roles which are combined with the implementer role matches either of the permitting user roles or not.

The permitting user information obtaining unit sometimes obtains permitting user information showing an upper level role including one or more other roles as lower level roles, as the permitting user roles, the information processing apparatus further includes an inclusion relationship information obtaining unit for obtaining inclusion relationship information showing inclusion relationship of the upper level role and the lower level roles, and the combination extracting unit, based on the inclusion relationship shown by the inclusion relationship information, determines if each of the permitter role corresponds to the lower level roles of the permitting user role or not, and extracts a combination of which at least a part of all permitter roles corresponds to the lower level roles of the permitting user role and remaining permitter roles match the permitting user role.

According to the present invention, an information processing apparatus includes:

an access control policy information obtaining unit for obtaining access control policy information showing a plurality of combinations of an implementer role which is permitted to access secret information, to which an access is limited, and one or more permitter roles which permit the implementer role to access the secret information;

an implementing user information obtaining unit for obtaining implementing user information showing one or more roles possessed by the implementing user who implements access to the secret information, as implementing user roles;

a permitting user information obtaining unit for obtaining permitting user information showing one or more roles possessed by a permitting user who permits the implementing user to access the secret information, as permitting user roles; and a combination extracting unit for extracting a combination of which an implementer role and each permitter role match either of the implementing user roles shown by the implementing user information and the permitting user roles shown by the permitting user information out of the plurality of combinations shown by the access control policy information.

The implementing user information obtaining unit sometimes obtains implementing user information showing an upper level role including one or more other roles as lower level roles, as the implementing user roles, the permitting user information obtaining unit sometimes obtains permitting user information showing an upper level role including one or more other roles as lower level roles, as the permitting user roles, the information processing apparatus further includes an inclusion relationship information obtaining unit for obtaining inclusion relationship information showing inclusion relationship of the upper level role and the lower level roles, and the combination extracting unit, based on the inclusion relationship shown by the inclusion relationship information, determines if the implementer role and each permitter role correspond to either of the lower level roles of the implementing user role and the lower level roles of the permitting user role or not, and extracts a combination of which at least a part of the implementer role and the all permitter roles correspond to either of the lower level roles of the implementing user role and the lower level roles of the permitting user role, and remains of the implementer role and the all permitter roles match either of the implementing user roles and the permitting user role.

The combination extracting unit, based on roles shown by the combination extracted, generates specified role information showing roles of administrators of two or more pieces of divided secret information divided from the secret information, as a specified role.

According to the present invention, a secret information management system includes:

an access control policy information obtaining unit for obtaining access control policy information showing a plurality of combinations of an implementer role which is permitted to access secret information, to which an access is limited, and one or more permitter roles which permit the implementer role to access the secret information;

an implementing user information obtaining unit for obtaining implementing user information showing one or more roles possessed by the implementing user who implements access to the secret information, as implementing user roles;

a permitting user information obtaining unit for obtaining permitting user information showing one or more roles possessed by a permitting user who permits the implementing user to access the secret information, as permitting user roles;

a combination extracting unit for extracting a combination of which an implementer role matches the implementing user roles shown by the implementing user information and of which each permitter role matches either of the permitting user roles shown by the permitting user information out of the plurality of combinations shown by the access control policy information, and for generating specified role information showing roles of administrators of two or more pieces of divided secret information divided from the secret information, as a specified role based on roles shown by the combination extracted;

a user role information obtaining unit for obtaining user role information showing a role possessed by each of a plurality of users;

a specified role information obtaining unit for obtaining the specified role information generated by the combination extracting unit;

a user extracting unit for comparing the role of each user shown by the user role information with each of the specified role shown by the specified role information, extracting a user possessing a role matched for each of the specified role, combining users extracted according to a combination of the specified roles, and generating a combination of users who become administrators of divided secret information; and a secret information dividing unit for generating divided secret information based on the combination of users who become the administrators of the divided secret information generated by the user extracting unit.

According to the present invention, a secret information management system includes:

an access control policy information obtaining unit for obtaining access control policy information showing a plurality of combinations of an implementer role which is permitted to access secret information, to which an access is limited, and one or more permitter roles which permit the implementer role to access the secret information;

an implementing user information obtaining unit for obtaining implementing user information showing one or more roles possessed by the implementing user who implements access to the secret information, as implementing user roles;

a permitting user information obtaining unit for obtaining permitting user information showing one or more roles possessed by a permitting user who permits the implementing user to access the secret information, as permitting user roles;

a combination extracting unit for extracting a combination of which an implementer role and each permitter role match either of the implementing user roles shown by the implementing user information and the permitting user roles shown by the permitting user information out of the plurality of combinations shown by the access control policy information, and for generating specified role information showing roles of administrators of two or more pieces of divided secret information divided from the secret information, as a specified role based on roles shown by the combination extracted;

a user role information obtaining unit for obtaining user role information showing a role possessed by each of a plurality of users;

a specified role information obtaining unit for obtaining the specified role information generated by the combination extracting unit;

a user extracting unit for comparing the role of each user shown by the user role information with each of the specified role shown by the specified role information, extracting a user possessing a role matched for each of the specified role, combining users extracted according to a combination of the specified roles, and generating a combination of users who become administrators of divided secret information; and a secret information dividing unit for generating divided secret information based on the combination of users who become the administrators of the divided secret information generated by the user extracting unit.

The user extracting unit generates combination extracted information showing the combination of users generated together with a role possessed by each user, the secret information management apparatus further includes:

a role information deleting unit for deleting information of the role of each user from the combination extracted information;

a redundant user information standardizing unit, when there exists a combination in which same users are redundantly combined in the combination extracted information, for removing redundancy of the users from the combination;

a redundant combination deleting unit, when there exist two or more combinations in which same users are combined with a different order describing the users in the combination extracted information, for removing a redundant combination; and an invalidated combination deleting unit, when any combination of users is included in another combination of users in the combination extracted information, for removing the combination which is included in the other combination.

Effect of the Invention

According to the present invention, since a combination of users who should become the administrators of divided secret information is extracted based on a combination of a role possessed by each user and a specified role, it is possible to implement safely the secret key backup even if the role base access structure in which the access structure is specified using the roles is used.

BEST MODE FOR CARRYING OUT THE INVENTION

Embodiment 1

In the present embodiment, when the role base access structure in which the access structure is specified using the roles is used, the technique to safely implement the secret key backup using the conventional secret distribution technique, by referring to the user who participates in the backup and validated roles validated by the user and obtaining the user base access structure in which the access structure is specified by each user similarly to the conventional access structure, will be explained.

FIG. 1 shows a functional configurational diagram of a secret key backup apparatus 101 according to the present embodiment.

The secret key backup apparatus 101 is an apparatus to extract users who become administrators of two or more fragments of secret key (divided secret information) that are divided from a secret key (secret information) out of plural users; the secret key backup apparatus is an example of a secret information management apparatus.

In FIG. 1, a backup participating user list obtaining unit 102 obtains backup participating user list information 201 (hereinafter, a backup participating user list 201) showing a list of users who participate in the backup and a list of validated roles validated by the users.

Although a detail will be explained later, the backup participating user list 201 is, as shown in FIGS. 2 and 3, information showing roles validated by each of the plural users, which is an example of user role information.

Then, the backup participating user list obtaining unit 102 is an example of a user role information obtaining unit.

A role base access structure obtaining unit 103 obtains role base access structure information 202 (hereinafter, role base access structure 202) which is a combination of roles by which the secret key can be restored.

Although a detail will be explained later, the role base access structure 202 is, as shown in FIGS. 4 and 5, information showing two or more roles as a restoration enabling combination, which is an example of specified role information.

Here, a role included in the restoration enabling combination is referred to as a specified role.

The role base access structure obtaining unit 103 is an example of a specified role information obtaining unit.

A role hierarchy information obtaining unit 104 obtains role hierarchy information 203 related to a hierarchical structure which is related among roles defined by the RBAC.

Although a detail will be explained later, the role hierarchy information 203 is, as shown in FIGS. 6 and 7, information showing inclusion relationship between an upper level role and a lower level role, which is an example of inclusion relationship information.

Namely, the role of user shown in the backup participating user list 201 may sometimes inherit another role (includes another role as the lower level role).

As discussed the above, when a certain user validates the upper level role which inherits another role, it is preferable to facilitate the management of the access authority by enabling the user who validates the upper level role to use the authority of lower level role. Because of this, the role hierarchy information 203 showing the inheritance relation between roles is used.

Here, the role hierarchy information obtaining unit 104 is an example of an inclusion relationship information obtaining unit.

A simultaneous validation prohibited role combination obtaining unit 105 obtains simultaneous validation prohibited role combination information 204 (hereinafter, simultaneous validation prohibited role combination 204) showing a combination of roles of which simultaneous validation by the user is prohibited.

Although a detail will be explained later, the simultaneous validation prohibited role combination 204 is, as shown in FIGS. 8 and 9, information showing two or more roles of which the simultaneous validation by the same user is prohibited as simultaneous validation prohibited roles (simultaneous combination prohibited roles), which is an example of simultaneous combination prohibited role information.

Namely, the backup participating user list 201 sometimes shows a user who validates two or more roles; in such a case, in order not to assign two or more roles to the same user redundantly, the simultaneous validation prohibited role combination 204 showing combinations of roles for which the simultaneous validation by the user is prohibited is used.

Here, the simultaneous validation prohibited role combination obtaining unit 105 is an example of a simultaneous combination prohibited role information obtaining unit.

Further, also in case a certain user validates the upper level role which inherits another role, in order not to assign two or more roles to the same user redundantly, it is necessary to consider the inheritance relation (the inclusion relationship) between roles. Because of this, it is determined whether a combination corresponds to the combination of the simultaneous validation prohibited roles or not by also checking the role hierarchy information 203 showing the inheritance relation between roles.

A backed-up secret key obtaining unit 106 obtains a secret key 205 for which the user wants to implement backup.

An all combination generating unit 107 generates all combination extracted result which are all possible combinations of users by whom the secret key is restorable, by assigning the users described in the backup participating user list 201 to the roles included in the role base access structure 202.

Namely, the all combination generating unit 107 compares the role of each user shown in the backup participating user list 201 with each specified role shown in the role base access structure 202, extracts a user who validates a role matched with each specified role, combines the extracted users according to the combination of specified roles, and generates a combination of users who become administrators of fragments of secret key.

The all combination generating unit 107, when a certain lower level role is shown in the role base access structure 202 as the specified role, derives an upper level role of the lower level role which is the specified role, extracts a user who validates the derived upper level role, and extracts the user who validates the upper level role by relating to the lower level role.

The all combination generating unit 107 is an example of a user extracting unit.

A same user/role deleting unit 108, when a user belonging to a certain role appears redundantly in the all combination extracted result, deletes such entry and generates the same user/role deleted result.

Namely, in the role base access structure 202, the same role is sometimes shown redundantly for at least two specified roles (the combination number No. 1 in the example of FIG. 5); in this case, all combination generating unit 107 extracts the user for each of two or more specified roles which are the same role, the same user/role deleting unit 108 excludes a combination of roles in which the same user is assigned to two or more specified roles (Role A and Role A) which are the same role.

Further, as discussed above, when the lower level role is the specified role, the all combination generating unit 107 also extracts a user for the upper level role of such lower level role, as a result of this, the same user may be assigned to two or more specified roles which are the same role.

For example, when Role D is the upper level role of Role A, and the specified role is "Role A and Role A", the same user corresponding to Role D is extracted redundantly and assigned to "Role A and Role A", which generates a combination of the same users. In such a case, the same user/role deleting unit 108 also excludes the combination of the same users.

A simultaneous validation prohibited role deleting unit 109, if a certain user validates plural roles of the combination specified by the simultaneous validation prohibited role combination 204 in the same user/role deleted result, deletes such entry and generates the simultaneous validation prohibited role deleted result.

Further, if the role base access structure 202 shows a combination of different specified roles (combination number No 2 in the example of FIG. 5), when the same user validates plural roles, the all combination generating unit 107 extracts the same user redundantly even if they are assigned to different specified roles. In such a case, the simultaneous validation prohibited role deleting unit 109 excludes the combination in which the same user is assigned to two or more specified roles, corresponding to the simultaneous validation prohibited role combination 204.

Further, as discussed above, when the lower level role is the specified role, the all combination generating unit 107 also extracts a user for the upper level role of such lower level role. At this time, when the lower level role is shown in the simultaneous validation prohibited role combination 204, the simultaneous validation prohibited role deleting unit 109 excludes a combination in which the same user is assigned to the upper level role and another role in the simultaneous validation prohibited role combination 204.

Here, the same user/role deleting unit 108 is also an example of the user extracting unit.

The simultaneous validation prohibited role deleted result juxtaposes the role to which the user belongs; a role information deleting unit 110 deletes that role information and generates role information deleted result.

When the same user appears in each entry of the role information deleted result, a redundant user information standardizing unit 111 removes the information as redundancy and generates redundant user information standardized result.

A redundant combination deleting unit 112 removes a redundant combination showing a combination of the same users, in which only the orders describing the user information are different, out of the redundant user information standardized result and generates redundant combination deleted result.

An invalidated combination deleting unit 113 removes a combination out of entries in the redundant combination deleted result, which is meaningless as a combination of users who can implement backup, since it is covered by the combination of users shown in another entry, and the invalid combination deleting unit 113 generates the user base access structure described using the user information.

A general access structure secret distributing unit 114 is a function to implement secret distribution of the secret key 205 based on the user base access structure.

Namely, the general access structure secret distributing unit 114 divides the secret key 205 which is secret information and generates fragments of secret key (divided secret information).

The general access structure secret distributing unit 114 is an example of a secret information dividing unit.

Next, the operation of the secret key backup apparatus 101 according to the present embodiment will be explained based on FIG. 18.

First, at S1801, the backup participating user list obtaining unit 102 obtains the backup participating user list 201 showing a list of users who participate in a backup and a list of roles validated by the users, which is managed by a system or an application.

FIG. 2 shows a configuration of the backup participating user list 201.

The backup participating user list 201 enumerates a pair of a participating user name 2011 of the users who participate in the backup and a validated role 2012 activated by each participating user.

In an example shown in FIG. 3, it is possible to show a case in which User C who activates Role C participates, a case in which User A who simultaneously validates Role A and Role B participates, and so on.

Next, at S1802, the role base access structure obtaining unit 103 obtains the role base access structure 202 which is a combination of the roles (the specified roles) by which the secret key 205 can be restored, from the security policies managed by the system or application.

FIG. 4 shows a configuration of the role base access structure 202.

The role base access structure 202 is configured by a combination number showing an entry number and a restoration enabling combination described using roles and operators such as AND/OR, etc.

In an example shown in FIG. 5, the combination number No. 1 shows an example in which the secret key 205 can be restored when there are two users of Role A, and the combination number No. 2 shows an example in which the secret key 205 can be restored by an indispensable attendance of the user of Role A, and further either two presences out of the user of Role B, the user of Role C, and the user of Role D.

Next, at S1803, the role hierarchy information obtaining unit 104 obtains role hierarchy information 203 related among roles defined by the RBAC, from the security policies managed by the system or application.

FIG. 6 shows a configuration of the role hierarchy information 203.

The role hierarchy information 203 is configured by a role which is to define the hierarchical structure and an ancestor role showing which role to inherit.

This means that the role can also have a role of the ancestor role.

For example, when Role D is described in "ROLE", and Role A is described in "ANCESTOR ROLE" as shown in FIG. 7, the user belonging to Role D can also have a role of Role A.

Namely, Role D is the upper level role, Role A is the lower level role, and Role D includes Role A.

Next, at S1804, the simultaneous validation prohibited role combination obtaining unit 105 obtains a simultaneous validation prohibited role combination 204 showing a combination of roles for which simultaneous validation by the user is prohibited, from the security policies managed by the system or application.

FIG. 8 shows a configuration of the simultaneous validation prohibited role combination 204.

The simultaneous validation prohibited role combination 204 is configured by a prohibited number showing an entry number and a prohibited role combination described using a role and the number of roles for which simultaneous validation is prohibited.

In an example shown in FIG. 9, the prohibited number No. 1 is an example specifying that simultaneous validation of two or more roles cannot be done among Role A, Role B, and Role C; and the prohibited number No. 2 is an example specifying that up to two roles can be validated simultaneously, but three or more roles cannot be validated simultaneously among Role A, Role B, and Role D.

Next, at S1805, the backed-up secret key obtaining unit 106 obtains the secret key 205, for which the user wants to implement a backup, as secret information managed by the system or application.

The secret key 205 can be any key such as a secret key of well-known RSA (Rivest-Shamir-Adleman) (registered trademark) cipher or a key of AES (Advanced Encryption Standard) cipher.

Next, at S1806, the all combination generating unit 107 generates the extracted result of all possible combinations of users by which the secret key 205 can be restored, by matching the users and the validated roles described in the backup participating user list 201 with the specified roles included in the role base access structure 202.

At this time, if the hierarchical structure is defined in the role, the user and the validated role are matched also considering the hierarchical structure. Further, the specified role specified in the original role base access structure 202 is also juxtaposed with parenthesis.

FIG. 10 shows a configuration of the all combination extracted result (extracted combination information).

The all combination extracted result is configured by a combination number showing an entry number and a restoration enabling combination enumerating a user, a validated role, and a specified role.

An example shown in FIG. 11 is the all combination extracted result generated based on the example of FIG. 3, the example of FIG. 5, and the example of FIG. 7. For example, the specified role "Role A" and the specified role "Role A" are specified in the combination number No. 1 of FIG. 5, the participating user name "User A" and the participating user name "User D" have the validated role "Role A" in the example of FIG. 3, so that combinations of four entries of combination numbers No. 1, No. 2, No. 3, and No. 4 of FIG. 11 are generated.

Here, UserA@RoleA(Role A) means that User A who can use the authority of Role A is set to the specified role "Role A" in the original role base access structure 202.

Here, the same users are set redundantly to the specified role "Role A" in the combination numbers No. 1 and No. 4; however, all combinations are enumerated at this step regardless of the redundancy, since the redundancy will be deleted at the next step.

Similarly, the combination numbers No. 5 through No. 12 are generated. Further, since Role D/Role E/Role F inherit Role A, a user belonging to these can be treated as a user belonging to Role A; however it does not affect the all combination extracted result, since there is no user who validates Role D/Role E/Role F.

On the other hand, if User A validates Role D as shown in FIG. 19, in case of the combination No. 1 of FIG. 5, User A is extracted as being matched to Role A, and in case of the combination No. 2 of FIG. 5, User A is extracted as being matched to Role A, Role B, and Role D.

Next, at S1807, when a user belonging to a certain validated role or a specified role redundantly appears in each entry of the all combination extracted result, the same user/role deleting unit 108 deletes such entry and generates the same user/role deleted result.

Further, when the hierarchical structure is defined in the role, a redundancy is deleted assuming that the validated roles or the specified roles that are in parent-child relationship the same roles.

The configuration of the same user/role deleted result is the same as the one shown in FIG. 8; the difference exists only in stored values.

FIG. 12 shows a result of deletion of entries including the same user/role based on FIG. 11; in the combination number No. 1 of FIG. 11, UserA@RoleA(Role A) is redundantly used, and in the combination number No 4, UserD@RoleA (RoleA) is redundantly used, which are detected and deleted. In this example, both of the validated role and the specified role are the same; however, the redundancy can be deleted if either one can be regarded as the same.

Further, when User A validates Role D as shown in FIG. 19, because of the inheritance relationship, for the combination No. 1 of FIG. 5, an entry of "UserA@RoleD(RoleA)+ UserA@RoleD(RoleA)" is included twice in the all combination extracted result; the two entries are deleted by the same user/role deleting unit 108.

Next, at S1808, the simultaneous validation prohibited role deleting unit 109, when a certain user validates plural roles of the combination of roles specified by the simultaneous validation prohibited role combination 204 of FIG. 9 in the same user/role deleted result, deletes such entry and generates the simultaneous validation prohibited role deleted result.

Further, when the hierarchical structure is defined in the role, the roles in the parent-child relationship are compared with the condition of the simultaneous validation prohibited roles, if the prohibited combination exists, such entry is deleted.

The configuration of the simultaneous validation prohibited role deleted result is the same as the one shown in FIG. 10; the difference exists only in stored values. FIG. 13 shows a result of the deletion of the entry in which the simultaneous validation prohibited roles are used, based on FIG. 12. In the combination numbers No. 5 and No. 6 of FIG. 12, although User A validates simultaneously Role A and Role B, since the simultaneous validation of Role A and Role B is prohibited in the prohibited number No. 1 of the simultaneous validation prohibited role combination 204 of FIG. 9, they are detected and deleted.

Further, if User A validates Role D as shown in FIG. 19, from the inheritance relationship, for the combination No. 2 of FIG. 5, entries such as "UserA@RoleD(RoleA)+ UserA @Role B (Role B)+User B@RoleC(Role C)" and "UserA@RoleD(RoleA)+UserA@RoleB(RoleB)+ UserA@RoleD(RoleD)" are included in the all combination extracted result; since the simultaneous validation of Role A and Role B is prohibited in the prohibited number No. 1 of the simultaneous validation prohibited role combination 204 of FIG. 9, these entries are deleted by the simultaneous validation prohibited role deleting unit 109.

Next, at S1809, although the validated role (the role written after @) and the specified role (the role written in parentheses) to which the user belongs are juxtaposed in the simultaneous validation prohibited role deleted result, the role information deleting unit 110 deletes the role information and generates the role information deleted result.

The configuration of the role information deleted result is the same as the one shown in FIG. 10; the difference exists in that the restoration enabling combination is specified using only the user information.

FIG. 14 shows a result of deletion of the role information based on FIG. 13; although a pair of user name and role has been used conventionally, as a result of the deletion of the role information, the restoration enabling combination is specified using only the user name.

Next, at S1810, when the same user appears in each entry of the role information deleted result, the redundant user information standardizing unit 111 generates redundant user information standardized result by removing the user as redundancy.

The configuration of the redundant user information standardized result is the same as the one shown in FIG. 10; the difference exists only in that the restoration enabling combination is specified by using only the user information.

FIG. 15 shows a result of removal of the user who redundantly appears, based on FIG. 14; since User B redundantly appears in the combination numbers No. 7 and No. 11 of the restoration enabling combination in FIG. 14, the redundancy is removed so that the appearance of User B is reduced to only once.

Next, at S1811, the redundant combination deleting unit 112 generates the redundant combination deleted result by removing redundant combination showing the same combination of users, though the order describing the user information are different in the redundant user information standardized result.

The configuration of the redundant combination deleted result is the same as the one shown in FIG. 10; the difference exists in that a restoration enabling combination is specified by using only the user information.

FIG. 16 shows a result of deletion of redundancy in which the order describing users are different, based on FIG. 15; since only the order describing User A and User D is different between the combination numbers No. 2 and No. 3 of FIG. 15, this redundancy is removed.

Next, at S1812, the invalidated combination deleting unit 113 removes an entry of the redundant combination deleted result that is meaningless as backup enabling combination of users, because the entry is included in the combination of users shown in another entry, thereby generating the user base access structure described using the user information.

The configuration of the user base access structure is the same as the one shown in FIG. 10; the difference exists in that the restoration enabling combination is specified using only the user information.

FIG. 17 shows a result of deletion of the entry included in another entry, based on FIG. 16; the combination number No. 8 of FIG. 16 automatically comes into effect if the key can be restored by the combination number No. 7, so that No. 8 is deleted by deeming to be included in No. 7.

Similarly, the combination number No. 9 and the combination number No. 10 are included in the combination number No. 2, and the combination number No. 12 is included in the combination number No. 11, so that Nos. 9, 10, and 12 are deleted.

Finally, at S1813, the general access structure secret distributing unit 114 implements secret distribution of the secret key 205 based on the user base access structure.

By inputting the access structure described by the user information shown in FIG. 17, it becomes possible to implement secret distribution using the conventional technique, so that fragments of secret key are generated from the secret key 205 using the conventional technique.

Then, the fragments of secret key are delivered to the participating users received in FIG. 2. As a matter of fact, even if the user is described in FIG. 2, there might be no fragment of secret key delivered to the user who does not appear in the restoration enabling combination of FIG. 17.

Here, as for delivery, for example, the fragment of secret key is delivered to a corresponding user through network such as LAN (Local Area Network), etc., a connecting terminal of an IC card, a USB memory, etc. connected to an apparatus, an extension card connecting bus such as PCI bus and so on.

Here, in the all combination extracted result generated by the all combination generating unit 107, the specified role (the role written in parentheses) described in the role base access structure 202 and the validated role (the role written after @) validated by the user are juxtaposed with the user information.

When it is desired to simplify the algorithm, it is sufficient to describe either one of the specified role and the validated role. In particular, it is effective when the role hierarchical structure is not supported, since it enables to reduce the processing data amount.

Further, when the role base access structure is a simple structure, it is sufficient to enumerate only the user information without juxtaposing the specified role or the validated role.

Further, in the present method, it is assumed that there exists the hierarchical structure in roles or the simultaneous validation prohibited roles; however, depending on software of the RBAC, some software may not support the role hierarchical structure or the simultaneous validation prohibited roles.

In this case, it is possible to omit the processes using the role hierarchical structure in the all combination generating unit 107, the same user/role deleting unit 108, and the simultaneous validation prohibited role deleting unit 109, and also omit the processes for detecting the simultaneous validation prohibited roles in the simultaneous validation prohibited role deleting unit 109.

Further, in the present method, after identifying the user who participates in the backup, the all combination extracted result is generated for that user.

Instead, it is also possible that the backup participating user list obtaining unit 102 obtains the user information of all users belonging to the role, and, regardless whether the user participates in the backup or not, the all combination generating unit 107 generates all combinations using the user information.

Further, it is also possible to exchange the processes of the same user/role deleting unit 108 and the simultaneous validation prohibited role deleting unit 109 in the order described in FIG. 1, since their processes are exchangeable in the processing order.

As for the redundant user information standardizing unit 111, the redundant combination deleting unit 112, and the invalidated combination deleting unit 113, their processes are exchangeable in the processing order, so that the processes can be implemented anywhere between the all combination generating unit 107 and the general access structure secret distributing unit 114.

The process of the simultaneous validation prohibited role combination obtaining unit 105 also can be implemented anywhere before implementing the process of the simultaneous validation prohibited role deleting unit 109.

The process of the backed-up secret key obtaining unit 106 can be also implemented anywhere before implementing the process of the general access structure secret distributing unit 114.

Further, in the present embodiment, the process is implemented based on the information of the role validated by the user; however, it is also possible to implement the process by adding the information of the role validated by the system instead of the user. Further, it is also possible to implement the process using the role assigned to the user by the administrator, namely, the information of role registered to the user.

As discussed above, when the access structure is specified using the roles, the access structure specified using the user information is generated using the information of the backup participating user list 201 which is a list of the users who participate in the secret key backup and the roles activated by the users, so that it becomes possible to implement the backup of the secret key using the conventional secret distribution technique which only supports the user base access structure described using the user information.

Further, from the viewpoint of clarifying the operation procedure, the step S1806, the step S1807, and the step S1808 have been described as respective different steps. However, from the viewpoint of reducing the memory usage or improving the processing speed, the above three steps can be implemented simultaneously. Namely, at S1806 for generating the all combination extracted result, it is prevented to generate an entry in which the same user or role is redundant, or further, it can be also prevented to generate an entry including the simultaneous validation prohibited roles. In this case, the all combination extracted result becomes an extremely large table; however, it is possible to directly generate the simultaneous validation prohibited role deleted result without generating the all combination extracted result, which enables to reduce the memory usage and improve the processing speed.

Here, if the all combination extracted result generated at the step S1806, the same user/role deleted result generated at the step S1807, the simultaneous validation prohibited role deleted result generated at the step S1808, the role information deleted result generated at the step S1809, the redundant user information standardized result generated at the step S1810, the redundant combination deleted result generated at the step S1811, or the user base access structure generated at the step S1812 is empty, it is deemed to be an error, since there is no combination with which the secret information is divided.

Further, in the RBAC model, it is possible to inherit the authority by defining the hierarchical structure in the role; however, the all combination extracted result is generated with considering the hierarchical structure of the role activated by the user, so that even if the role hierarchical structure is used, it is possible to generate fragments of secret key by properly interpreting the role base access structure to generate the user base access structure and implementing secret distribution of the secret key.

Further, the information of user who participates in the backup is selected and used, it is possible to reduce the complexity of user base access structure, and further it is possible to reduce generating process of fragments of secret key or reduce the number of fragments of secret key compared with a case of delivering fragments of secret key to all the registered users.

Further, in the same user/role deleting unit 108, it is detected a case where the user belonging to a certain validated role or a specified role is counted redundantly, so that it is possible to eliminate a risk that one user is counted as plural users and the user receives more fragments of secret key than expected.

Further, in the simultaneous validation prohibited role deleting unit 109, it is checked if the simultaneous validation prohibited roles are used at the time of implementing the backup of the secret key, and the combination of prohibited roles is detected and deleted, so that it is possible to support the Dynamic SoD policy which is defined by the NIST RBAC model.

Further, in the role information deleting unit 110, the redundant user information standardizing unit 111, the redundant combination deleting unit 112, or the invalidated combination deleting unit, the role information is deleted and the access structure specified only by the user information is extracted, the redundancy or the inclusion relationship is checked, and unnecessary entries are deleted, so that it is possible to generate the user base access structure, and further generate fragments of secret key from the secret key using the secret distribution system having the general access structure which is the conventional technique.

Embodiment 2

The first embodiment is the secret key backup method where the role base access structure which is the combination of roles by which the secret key can be restored is received as an input.

However, in the RBAC, since the access authority is managed using the access control policy information (also called simply as the access control policy, hereinafter), it is necessary that the system administrator should maintain the two of the access control policy and the role base access structure without inconsistency.

Then, in the second embodiment, a technique to eliminate the management of the role base access structure when the RBAC is used, by automatically generating the role base access structure based on the access control policy describing the operation permitted to the operator such as administrators, general users, etc., will be explained.

FIG. 21 is a functional configurational diagram of a secret key backup system 3000 related to the present embodiment.

A role base access structure generating apparatus 2101 is an apparatus to automatically generate the role base access structure based on the access control policy information describing the operation permitted to the operator such as administrators or general users, etc. The role base access structure generating apparatus 2101 is an apparatus to be used as an additional function of the secret key backup apparatus 101 which has been shown in the first embodiment.

In FIG. 21, the explanation for the secret key 205, the role hierarchy information 203, the backed-up secret key obtaining unit 106, and the role hierarchy information obtaining unit 104, will be omitted, since they are the same as the ones in the first embodiment.

An access control policy 2102 is information describing the operation (the access authority, hereinafter) permitted to the operator such as the administrators or general users, etc., which is the information used by the RBAC system that is used with the present apparatus.

The access authority is generally configured by the name of permitted role (the permitted role is also called as an implementer role) showing "to whom", the object of permitted operation showing "what", and the contents of permitted operation showing "how" as shown in FIG. 23 or FIG. 24.

Further, plural permitters showing "condition" to permit are specified as an option.

The permitter is specified by the role (the permitter role) instead of the user name, and it may not be specified if the permission is unnecessary. Further, since the number N of permitter roles described here is changeable, N becomes a different value for each system. By enumerating these plural access authorities, the access control policy 2102 is configured.

Like the above, the access control policy 2102 is information showing plural combinations of the permitted role and one or more permitted roles; the permitted role is permitted to access the secret key (secret information), to which the access is limited, and the one or more permitter roles permit the permitted role to access the secret key.

Backup implementing user information 2103 is a list of implementing user names of users who try to implement the backup process and the validated roles validated by the users.

As shown in FIG. 25, backup implementing user information 2103 is the information configured by the implementing user name by which an individual user can be identified and the validated role 1 through the validated role M which are the roles validated by the user. The number M of validated roles described here is a value which changes according to the status at the time of implementing the backup, since it is the number of the roles validated by the user.

Like the above, the backup implementing user information 2103 is information showing the validated roles (implementing user roles) of the implementing user who implements the access to the secret key, which is an example of the implementing user information.

A backup permitting user list 2104 is information showing a list of combination of the user name of the user who permits the backup implementing user to implement the backup and the validated roles validated at the time of permitting.

As shown in FIG. 22, the backup permitting user list 2104 is a list showing pairs of the permitting user name of the user who permits the backup and the validated role validated by the permitting user at the time of permitting.

Like the above, the backup permitting user list 2104 is information showing the validated role (the permitting user role) of the permitting user who permits the implementing user to access the secret key, which is an example of the permitting user information.

An access control policy obtaining unit 2105 is a function to obtain the access control policy 2102.

The access control policy obtaining unit 2105 is an example of the access control policy information obtaining unit.

A backup implementing user information obtaining unit 2106 is a function to obtain the backup implementing user information 2103.

The backup implementing user information obtaining unit 2106 is an example of the implementing user information obtaining unit.

A backup permitting user list obtaining unit 2107 is a function to obtain the backup permitting user list 2104.

The backup permitting user list obtaining unit 2107 is an example of the permitting user information obtaining unit.

A backup authority extracting unit 2108 is a function to extract only information describing the access authority related to backup among various access authorities described in the access control policy 2102.

In order to implement the extraction, the secret key is received from the backed-up secret key obtaining unit 106. Then, only information in which the object of permitted operation shows the secret key received and also the contents of permitted operation shows the backup operation, is extracted in the access control policy 2102. The result obtained by this extraction is called as "an access authority list (backup authority extracted result)", hereinafter.

A valid access authority extracting unit 2109 is a function to extract the access authority which can be used as original information to generate the role base access structure, from the access authority list (the backup authority extracted result) received from the above backup authority extracting unit 2108, with considering the backup implementing user information 2103, the backup permitting user list 2104, and the role hierarchy information 203. The result obtained by this extraction is called as "an access authority list (valid access authority extracted result)", hereinafter.

A role base access structure generating unit 2110 is a function to generate the role base access structure based on the access authority list (the valid access authority extracted result) extracted by the valid access authority extracting unit 2109. The role base access structure to be generated is the same as the one shown in the first embodiment.

The backup unit 101 corresponds to the secret key backup apparatus 101 shown in the first embodiment and is configured by the backup participating user list obtaining unit, the role base access structure obtaining unit, the role hierarchy information obtaining unit, the simultaneous validation prohibited role combination obtaining unit, the backed-up secret key obtaining unit, the all combination generating unit, the same user/role deleting unit, the simultaneous validation prohibited role deleting unit, the role information deleting unit, the redundant user information standardizing unit, the redundant combination deleting unit, the invalidated combination deleting unit, and the general access structure secret distributing unit.

The explanation of a detail will be omitted, since they are the same as the ones in the first embodiment.

Next, the operation of the secret key backup system 3000 according to the present embodiment will be explained with reference to FIG. 26.

First, at S2601, the access control policy obtaining unit 2105 obtains an access control policy 2102 from the security policies managed by the system or application.

FIG. 23 shows a configuration of the access control policy 2102.

The access control policy 2102 is a list enumerating the access authorities configured by a name of permitted role, contents of permitted operation, an object of permitted operation, and a permitter 1 through a permitter N.

The name of permitted role is information specifying which role to assign the access authority.

The contents of permitted operation is information showing what kind of operation to permit.

The object of permitted operation is information showing what kind of information for which the access authority is defined such as a secret key or log information, etc.

The permitter 1 through the permitter N are information showing a role which makes the access authority deemed as valid by permitting the access structure.

The first line of an example shown in FIG. 24 represents the access authority that the user who validates Role A specified in the name of permitted role has the access authority to implement backup specified in the contents of permitted operation for the secret key 1 specified in the object of permitted operation. However, the access authority is valid only when the permission to backup is given by the user belonging to Role A as specified in the permitter 1 (The access authority is valid only when the permission is given by the users belonging to all the permitter roles, if there are plural permitter roles as shown in the second line).

The access control policy 2102 is configured by this kind of access authorities in a list format.

Next, at S2602, the backup implementing user information obtaining unit 2106 obtains the backup implementing user information 2103 related to the user who tries to implement a backup process, the backup implementing user information 2103 is managed by the system or application.

FIG. 25 shows a configuration of the backup implementing user information 2103.

The backup implementing user information 2103 is configured by an implementing user name and a validated role 1 through a validated role M.

The implementing user name shows a user name of the user who tries to implement the backup process. Further, the validated role 1 through the validated role M show a list of the roles validated by the user.

Next, at S2603, with respect to the operation to implement the backup by the user included in the backup implementing user information 2103 obtained at S2602, the backup permitting user list obtaining unit 2107 obtains the backup permitting user list 2104 which is a list of the roles of the permitters who permit the backup process, from the security policies managed by the system or application.

There exists the backup permitting user list 2104 for each of the implementing user, the operation object (the secret key 1, etc.), and the contents of operation (backup, etc.).

FIG. 22 shows a configuration of the backup permitting user list 2104.

The backup permitting user list 2104 is a list enumerating pairs of a permitting user name and validated roles.

The permitting user name is a user name of a permitter who permits a backup process, with regard to the operation to implement the backup by the backup implementing user.

The validated role is a role validated by the permitting user when permitting the backup.

Next, at S2604, the role hierarchy information obtaining unit 104 obtains the role hierarchy information 203 related among the roles defined by the RBAC, from the security policies managed by the system or application.

Since the role hierarchy information 203 has the same configuration as the role hierarchy information 203 shown in the first embodiment, the explanation will be omitted.

Next, at S2605, the backed-up secret key obtaining unit 106 obtains the secret key for which the user wants to implement the backup, from the security policies managed by the system or application.

As shown in the first embodiment, this secret key can be, for example, a secret key of well-known RSA (registered trademark) cipher or a common key of the AES cipher.

Next, at S2606, the backup authority extracting unit 2108 extracts only the access authority related to the backup among various access authorities described in the access control policy 2102 obtained at S2601.

As for the extraction, only information in which the object of permitted operation shows the secret key obtained at S2605 and also the contents of permitted operation shows the backup operation, is extracted in the access control policy 2102.

This extraction makes the access authority list (the backup authority extracted result), and the structure is the same as the access control policy 2102.

Next, at S2607, the valid access authority extracting unit 2109 extracts the access authority list (the valid access authority extracted result) which can be used as original information for generating the role base access structure, from the access authority list (the backup authority extracted result) generated at S2606, with considering the backup implementing user information 2103, the backup permitting user list 2104, and the role hierarchy information 203.

Two main examples of this extraction algorithm will be shown.

The first extraction method example 1 is a method to implement a strict check.

At first, the validated role 1 through the validated role M are obtained from the backup implementing user information 2103, and the role which matches the name of permitted role of the access authority list (the backup authority extracted result) generated at S2606 is extracted.

At this time, the role is deemed to be matched and also extracted when the name of permitted role of the access authority list (the backup authority extracted result) corresponds to the lower level role of the validated role 1 through the validated role M validated by the user, with considering the role hierarchy information 203.

Further, it is checked if all roles described in the permitter 1 through the permitter N are described in either of the validated roles of the backup permitting user list 2104, and only the case where the role is included is extracted.

At this time, the role is deemed to be matched and also extracted when the role described in the permitter 1 through the permitter N corresponds to the lower level role of the validated role validated by the backup permitting user, with considering the role hierarchy information 203.

Further, among the permitter 1 through the permitter N, it is unnecessary to implement the comparing process for the permitter to whom the role is not specified; it is sufficient to implement the comparing process for only the permitter to whom the role is specified.

Through the above operation, the access authority list (the valid access authority extracted result) which is necessary to generate the role base access structure is generated.

The extraction method example 2 is a method with looser comparison condition, and is a method to implement extraction without distinguishing between the implementing user and the permitting user.

Specifically, the method example 2 is a method to extract only the access authority in which the names of permitted role and all of the permitter 1 through the permitter N are included in either of the validated role 1 through the validated role M described in the backup implementing user information 2103 and the validated role of the backup permitting user list 2104, among the access authority list (the backup authority extracted result) generated at S2606.

Because of this, the name of permitted role can be included in either of the validated roles of the backup permitting user list 2104, or all of the permitter 1 through the permitter N can be included in the validated role 1 through the validated role M described in the backup implementing user information 2103.

At this time, the access authority is also extracted when the upper level role of the role described in the name of permitted role and the permitter 1 through the permitter N is matched to the validated role 1 through the validated role M described in the backup implementing user information 2103 or the validated roles of the backup permitting user list 2104, with considering the role hierarchy information 203.

Further, among the permitter 1 through the permitter N, it is not necessary to implement the comparing process for the permitter to whom the role is not specified; it is sufficient to implement the comparing process for only the permitter to whom the role is specified.

Through the above operation, the access authority list (the valid access authority extracted result) which is necessary to generate the role base access structure is generated.

Next, at S2608, the role base access structure generating unit 2110 generates the role base access structure from the access authority list (the valid access authority extracted result) generated at S2607.

Specifically, one access authority is extracted from the access authority list (the valid access authority extracted result).

The name of permitted role and the permitter 1 through the permitter N described in the access authority are deemed to be a combination of roles by which the secret key can be restored.

Namely, the combination becomes elements which constitute one line of the table of the role base access structure shown in FIG. 4.

Here, when there are combinations of {Role B, Role C}, {Role C, Role D}, {Role B, Role D}, it is possible to reduce the data amount with an abbreviated description like "2 of {Role B, Role C, Role D}".

The same conversion is made for all the access authorities included in the access authority list (the valid access authority extracted result), thereby forming the role base access structure.

Finally, at S2609, with the method shown in the first embodiment, the backup unit 101 receives the backup participating user list, the role hierarchy information, the simultaneous validation prohibited role combination, and the secret key managed by the system or application as inputs in addition to the role base access structure generated at S2608, and the backup unit 101 generates fragments of secret key.

Here, the configuration of the access control policy 2102 is shown in FIG. 23; however, the configuration of the access control policy 2102 varies according to the system.

Therefore, it is considered in some cases that the contents of permitted operation or the object of permitted operation is omitted.

In this case, at S2606, the comparison of the contents of permitted operation or the object of permitted operation can be omitted.

Further, similarly, when the access control policy 2102 does not include elements of the permitter 1 through the permitter N, it can be treated as no permitter is specified at S2607 and S2608.

Further, the backup implementing user information 2103 shown in FIG. 25 includes the implementing user name; such description is done because the implementing user name and the validated role 1 through the validated role M are often related and managed in the real system.

However, since the implementing user name is unnecessary in the process of the present method, it can be deleted from the backup implementing user information 2103.

Further, for the backup permitting user list 2104 shown in FIG. 22, a table showing pairs of the permitting user name and the validated role, is used. However, since the permitting user name is unnecessary in the process of the present method, it is sufficient that the backup permitting user list 2104 is configured only by the validated role.

Further, the backup permitting user list 2104 shown in FIG. 22 is a table showing pairs of the permitting user name and the validated role. If the same permitting user gives permissions under plural roles, an enumeration can be done in the following manner.

Namely, (1) plural pieces of role information are enumerated in the validated role (plural pieces of role information are enumerated in one record).

(2) while only one role is specified in the validated role, plural pairs of the permitting user name and the validated role are enumerated (one role is specified in one record, and plural records are provided as well).

Further, it is considered in many cases the role information which the user explicitly validates is described in the validated role 1 through the validated role N of the backup implementing user information 2103 shown in FIG. 25 or the validated role of the backup permitting user list 2104 shown in FIG. 22; the information of the role automatically validated by the system instead of the user can be also described. Further, the role assigned to the user by the administrator, namely, the information of the role registered to the user can be described as the validated role.

Further, since S2601, S2602, S2603, S2604, and S2605 are respectively independent processes, the processes are not necessarily implemented in order of the description. It is sufficient to implement S2601 before S2606, S2602 before S2607, S2603 before S2607, S2604 before S2607, and S2605 before S2606.

Further, at S2605, the example has shown that the backed-up secret key obtaining unit receives the secret key of RSA (registered trademark) cipher or the common key of AES cipher as an input; however, the information to be received is not necessarily a key of the cipher algorithm but can be any information as long as it is backed-up. For example, it can be information such as confidential documents or customer information, etc.

Further, at S2606, the backup authority extracting unit 2108 carries out only narrowing by the contents of permitted operation and the object of permitted operation and generates the access authority list (the backup authority extracted result) which is configurationally the same as the access control policy 2102. However, since the information of the contents of permitted operation and the object of permitted operation is unnecessary for the subsequent processes, the configuration can be the access control policy 2102 from which the contents of permitted operation and the object of permitted operation are deleted. The same can be said for the configuration of the access authority list (the valid access authority extracted result).

Further, at S2606, the backup authority extracting unit 2108 extracts only the access authority related to the backup among various access authorities described in the access control policy 2102 obtained at S2601. This is because the example shows a case where the backup of the secret key is implemented in the secret information management apparatus. If the authority is defined separately for the backup and the restoration, it is sufficient to implement the process by extracting the restoration authority instead. Further, it is considered that the operation to obtain secret information by implementing secret distribution, and the operation to obtain secret information by implementing secret distribution are called with different names for each system, so that it is necessary to search with the operation name which is the most suitable to that system.

Further, at S2607, the valid access authority extracting unit 2109 extracts the valid access authority based on the backup implementing user information 2103, the backup permitting user list 2104, and the role hierarchy information 203; however, it is also possible to implement the narrowing with considering the simultaneous validation prohibited role combination in addition to the above.

Further, in the present embodiment, the permitted role and the permitter role described in the access authority list (the backup authority extracted result) are matched with the role included in the backup implementing user information and the role included in the backup permitting user list, and the role base access structure is generated.

Instead of this, the role base access structure can be also generated from the permitted role and the permitter role described in the access authority list (the backup authority extracted result).

For example, it is possible to generate the role base access structure of {Role A, Role A} from the first line of record of FIG. 24, and the role base access structure of {Role A, Role B, Role C} from the record of the second line.

Here, if the access authority list (the backup authority extracted result) generated at the step S2606, the access authority list (the valid access authority extracted result) generated at the step S2607, or the role base access structure generated at the step S2608 is empty, it is deemed to be an error, since there is no combination to share the secret information.

As discussed above, since the role base access structure is generated from the access authority to permit the backup specified in the access control policy 2102, based on the backup implementing user information 2103, the backup permitting user list 2104, and the role hierarchy information 203, it is possible to automatically calculate the combination of roles by which the secret key can be restored and to implement flexibly the backup of the secret key as long as only the access control policy 2102 is maintained.

Further, the access authority list (the valid access authority extracted result) is generated with considering the hierarchical structure of the roles validated by the user and the hierarchical structure of the roles validated by the user who permits the backup, so that even if the role hierarchical structure is used, it is possible to properly generate the role base access structure automatically, and generate fragments of secret key by implementing secret distribution of the secret key.

Further, the information of the user who implements the backup or the user who implements the permission is selected and used, the complexity of the generated role base access structure can be reduced, so that it is possible to delete the generating process of the fragments of secret key or reduce the number of fragments of secret key compared with a case in which the fragments of secret key are delivered to all the users of the access authority of backup registered in the access control policy 2102.

Finally, the hardware configurational example of the secret key backup apparatus 101 and the role base access structure generating apparatus 2101 (the secret key backup apparatus 101, etc., hereinafter) shown in the first and second embodiments will be explained.

FIG. 20 shows an example of hardware resource of the secret key backup apparatus 101, etc. shown in the first and second embodiments. Here, the configuration of FIG. 20 shows merely one of examples of hardware configuration of the secret key backup apparatus 101, etc.; and the hardware configuration of the secret key backup apparatus 101, etc. is not limited to the configuration shown in FIG. 20, but can be another configuration.

In FIG. 20, the secret key backup apparatus 101, etc. includes a CPU 911 (also called as Central Processing Unit, a central processing device, a processing device, an arithmetic device, a micro-processor, a micro-computer, a processor) which executes programs.

The CPU 911 is connected to, for example, a ROM (Read Only Memory) 913, a RAM (Random Access Memory) 914, a communication board 915, a display device 901, a keyboard 902, a mouse 903, and a magnetic disk drive 920 via a bus 912, and controls these hardware devices.

Moreover, the CPU 911 can be connected to an FDD 904 (Flexible Disk Drive), a compact disk drive 905 (CDD), a printer device 906, and a scanning device 907. Further, instead of the magnetic disk drive 920, the CPU 911 can be connected to memory devices such as an optical disk drive, a memory card (registered trademark) reader/writer device, etc.

The RAM 914 is an example of a volatile memory. Storage medium of the ROM 913, the FDD 904, the CDD 905, and the magnetic disk drive 920 are examples of a non-volatile memory. These are examples of the memory device.

The communication board 915, the keyboard 902, the mouse 903, the scanner device 907, and the FDD 904, etc. are examples of the inputting device.

Further, the communication board 915, the display device 901, and the printer device 906, etc. are examples of the device.

For example, the communication board 915 is connected to a LAN (local area network), the Internet, or a WAN (wide area network), etc.

The magnetic disk drive 920 stores an operating system 921 (OS), a window system 922, programs 923, and files 924.

Programs of the programs 923 are executed by the CPU 911 with using the operating system 921 and the window system 922.

Further, the RAM 914 stores temporarily at least a part of the programs of the operating system 921 and application programs to be executed by the CPU 911.

Further, the RAM 914 stores various data which is necessary for the processing by the CPU 911.

Further, the ROM 913 stores BIOS (Basic Input Output System) programs, and the magnetic disk drive 920 stores boot program.

At the time of starting the secret key backup apparatus 101, etc., the BIOS program of the ROM 913 and the boot program of the magnetic disk drive 920 are executed, and the operating system 921 is started by the BIOS program and the boot program.

The above programs 923 store programs executing functions explained in the first and second embodiments as " - - - unit". The programs are read and executed by the CPU 911.

The files 924 can include the backup participating user list 201, the role base access structure 202, the role hierarchy information 203, the simultaneous validation prohibited role combination 204, the secret key 205, the access control policy 2102, the backup implementing user information 2103, and the backup permitting user list 2104.

Further, the extracted combination of users (FIG. 10 through FIG. 17), the access authority list (the backup authority extracted result), and the access authority list (the valid access authority extracted result), etc. are stored in the RAM 914, the magnetic disk drive 920, a cache memory, a buffer memory, a register, etc., not illustrated.

Furthermore, the fragments of secret key generated from the secret key 205 are also stored in the RAM 914, the magnetic disk drive 920, the cache memory, the buffer memory, the register, etc., not illustrated.

The files 924 stores information, data, signal values, variable values, or parameters showing processed result explained in the first and second embodiments as "determination of - - - ", "obtainment of - - - ", "extraction of - - - ", "comparison of - - - ", "deletion of - - - ", "update of - - - ", "setting of - - - ", "registration of - - - ", and "detection of - - - ", etc. as each item of " - - - file" or " - - - database". " - - - file" or " - - - database" is stored by the recording medium such as disks or memories, etc. The information, data, signal values, variable values, or parameters stored in the storage medium such as disks or memories, etc. are read by the CPU 911 via the reading/writing circuit to a main memory or a cache memory, and used for the operation of the CPU such as extraction, search, reference, comparison, operation, calculation, processing, edition, output, print, and display, etc. During the operation of the CPU of extraction, search, reference, comparison, operation, calculation, processing, edition, output, print, and display, the information, data, signal values, variable values, or parameters are temporarily stored in the main memory, the register, the cache memory, and the buffer memory, etc.

Further, an arrow part of the flowcharts explained in the first and second embodiments mainly shows input/output of data or signals, and data or signal values are stored in recording medium such as a memory of the RAM 914, a flexible disk of the FDD 904, a compact disk of the CDD 905, a magnetic disk of the magnetic disk drive 920, and other optical disk, mini disk, DVD, etc. Further, data or signals are transmitted online by the bus 912, signal lines, cables, and other transmission medium.

Further, " - - - unit" explained in the first and second embodiments can be " - - - circuit", " - - - device", and " - - - equipment", and can be also " - - - step", " - - - procedure", and " - - - process". That is, " - - - unit" can be implemented by the firmware stored in the ROM 913. Or it is also possible to implement only by software, only by hardware such as elements, devices, boards, and wirings, etc., or a combination of software and hardware, and a combination further with firmware. The firmware and software are stored as programs in the recording medium such as the magnetic disk, the flexible disk, the optical disk, the compact disk, the mini disk, the DVD, etc. The programs are read by the CPU 911, and executed by the CPU 911. That is, the programs are to function a computer as " - - - unit" in the first and second embodiments. Or the programs are to have the computer execute procedures or methods of " - - - unit" in the first and second embodiments.

Like this, the secret key backup apparatus 101, etc. shown in the first and second embodiments is a computer including the CPU being the processing unit, memories and magnetic disks, etc. being the storage device, the keyboard, the mouse, the communication board, etc. being the inputting devices, the display device, the communication board, etc. being the outputting device, and, as discussed above, is to implement functions shown as " - - - unit" using these processing unit, the storage device, the inputting device, and the outputting device.

BRIEF EXPLANATION OF THE DRAWINGS

FIG. 2 is a diagram showing a configurational example of a backup participating user list according to the first embodiment.

FIG. 3 shows an example of a backup participating user list according to the first embodiment.

FIG. 8 is a diagram showing a configurational example of simultaneous validation prohibited role combination according to the first embodiment.

FIG. 9 is a diagram showing an example of simultaneous validation prohibited role combination according to the first embodiment.

FIG. 10 is a diagram showing a configurational example of an extracted restoration enabling combination according to the first embodiment.

FIG. 11 is a diagram showing an example of an extracted restoration enabling combination (all combinations extraction) according to the first embodiment.

FIG. 12 is a diagram showing an example of an extracted restoration enabling combination (after deleting the same user/role) according to the first embodiment.

FIG. 13 is a diagram showing an example of an extracted restoration enabling combination (after deleting simultaneous validation prohibited roles) according to the first embodiment.

FIG. 14 is a diagram showing an example of an extracted restoration enabling combination (after deleting role information) according to the first embodiment.

FIG. 15 is a diagram showing an example of an extracted restoration enabling combination (after standardizing redundant user information) according to the first embodiment.

FIG. 16 is a diagram showing an example of an extracted restoration enabling combination (after deleting a redundant combination) according to the first embodiment.

FIG. 17 is a diagram showing an example of an extracted restoration enabling combination (after deleting an invalidated combination) according to the first embodiment.

FIG. 19 is a diagram showing an example of a backup participating user list according to the first embodiment

FIG. 24 is a diagram showing an example of an access control policy according to the second embodiment.

FIG. 25 is a diagram showing an example of backup implementing user information according to the second embodiment.

EXPLANATION OF SIGNS

Figure 1:
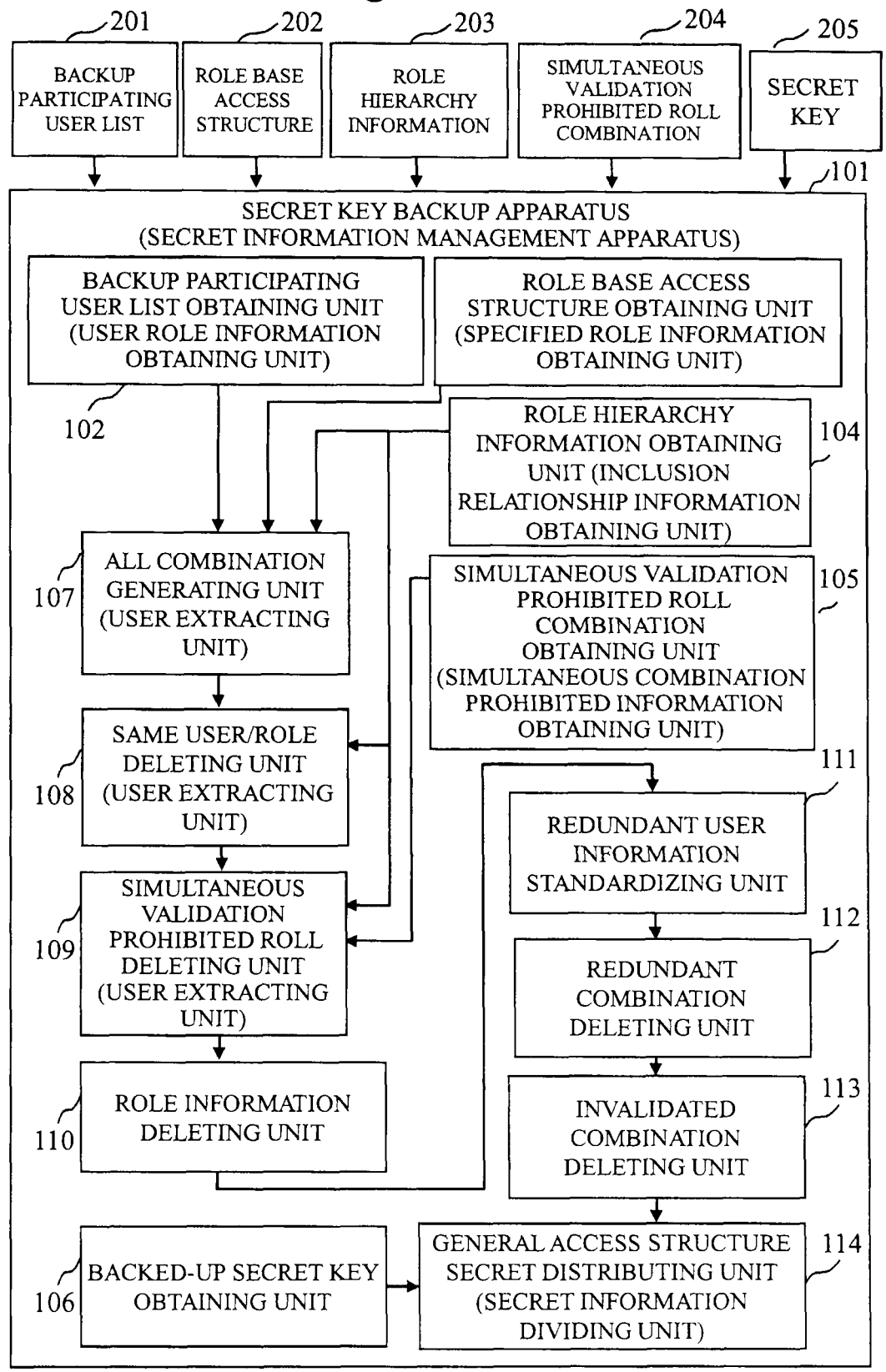
FIG. 1 is a diagram showing a configurational example of a secret key backup apparatus according to the first embodiment.
Figures 4, 5:
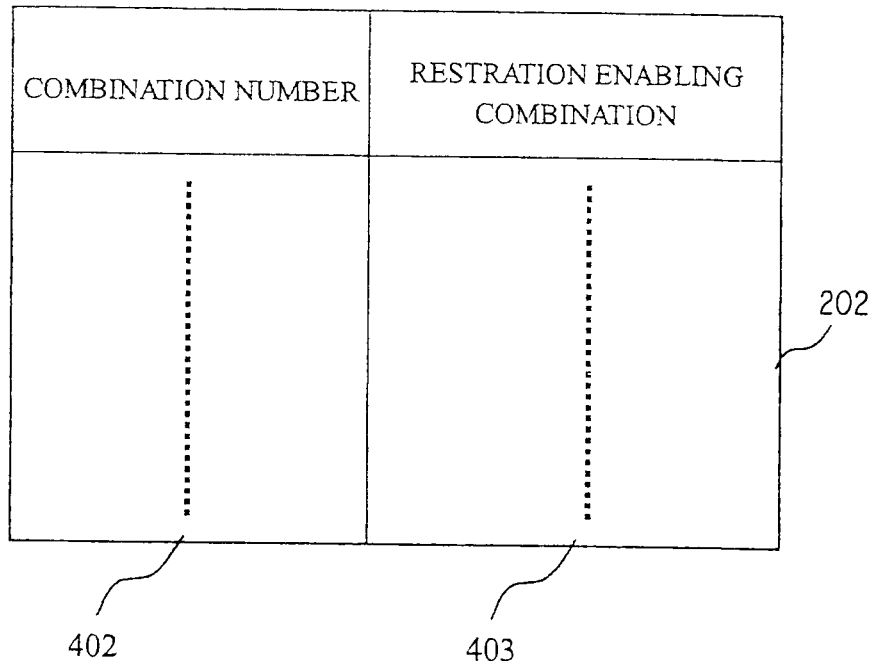
FIG. 4 is a diagram showing a configurational example of a role base access structure according to the first embodiment.
FIG. 5 is a diagram showing an example of the role base access structure according to the first embodiment.
Figures 6, 7:
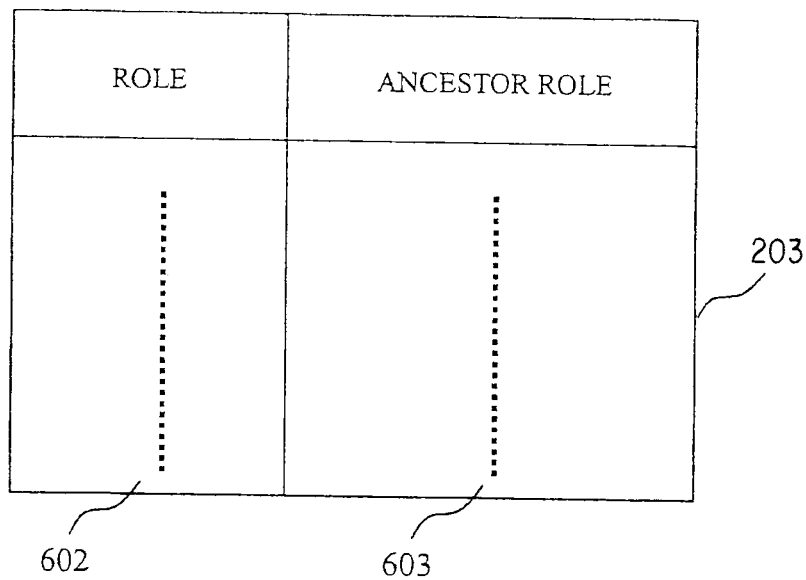
FIG. 6 is a diagram showing a configurational example of role hierarchy information according to the first embodiment.
FIG. 7 is a diagram showing an example of the role hierarchy information according to the first embodiment.
Figure 18:
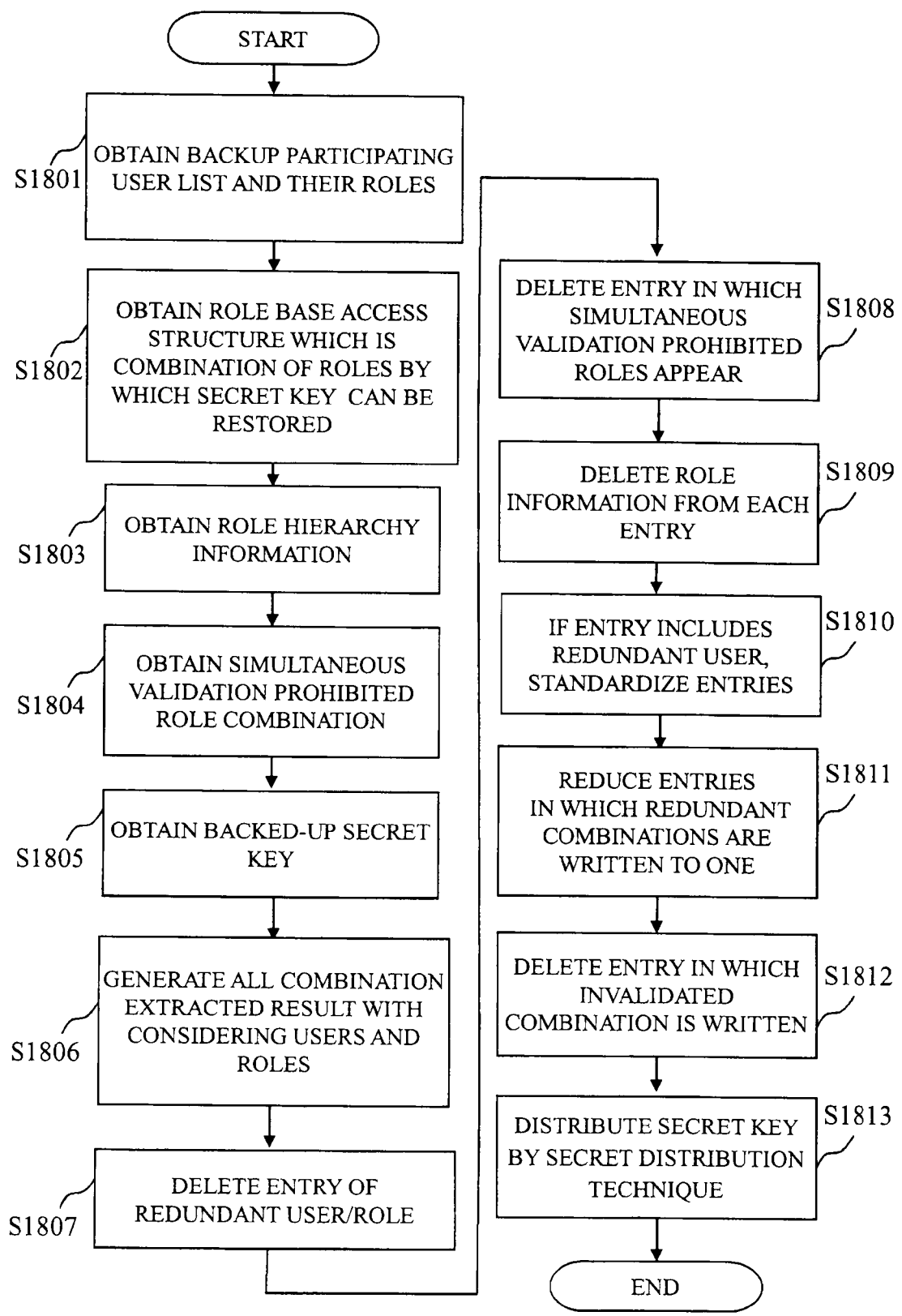
FIG. 18 is a flowchart showing an operation of the secret key backup apparatus according to the first embodiment.
Figure 20:
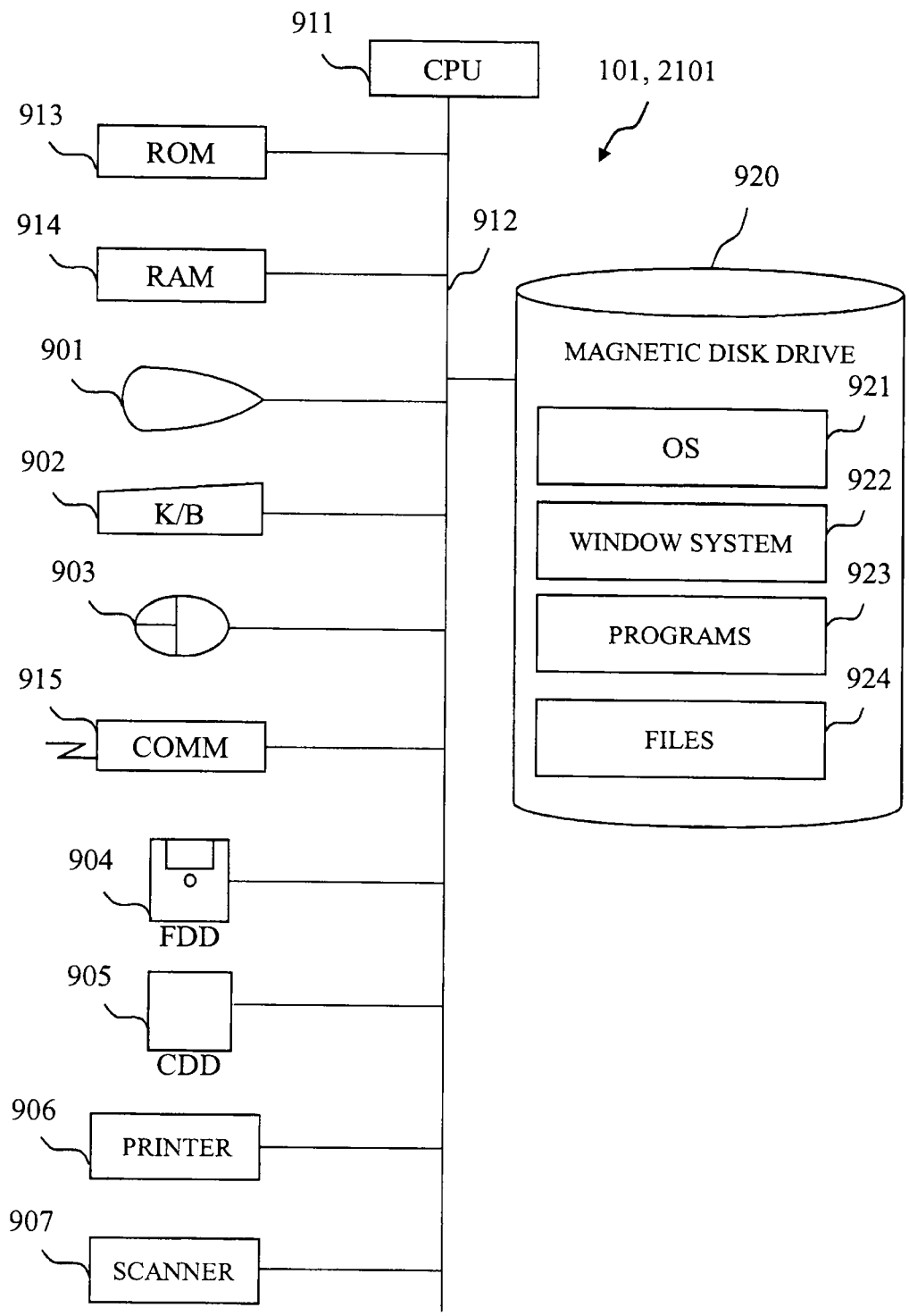
FIG. 20 is a diagram showing an example of hardware configuration of the secret key backup apparatus according to the first embodiment.
Figure 21:
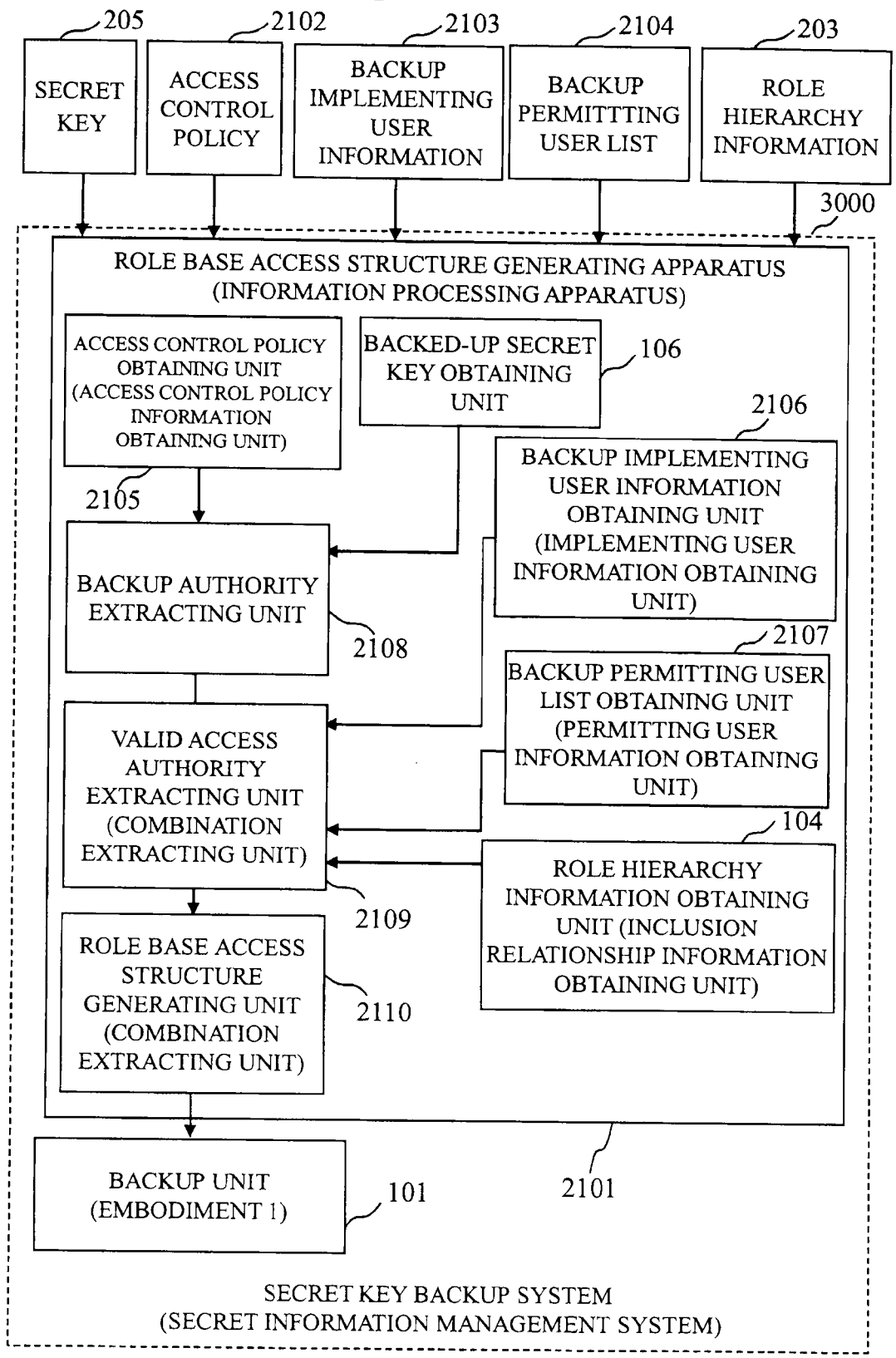
FIG. 21 is a diagram showing a configurational example of the secret key backup system according to the second embodiment.
Figure 22:
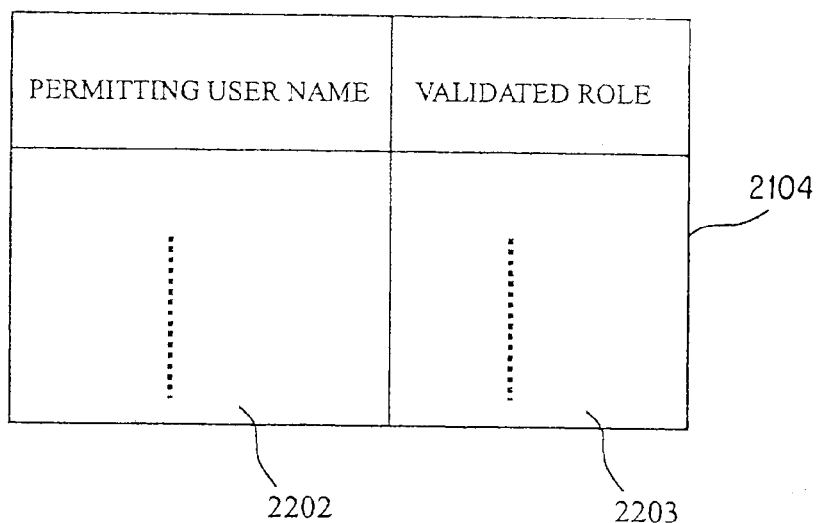
FIG. 22 is a diagram showing a configurational example of a backup permitting user list according to the second embodiment.
Figure 23:
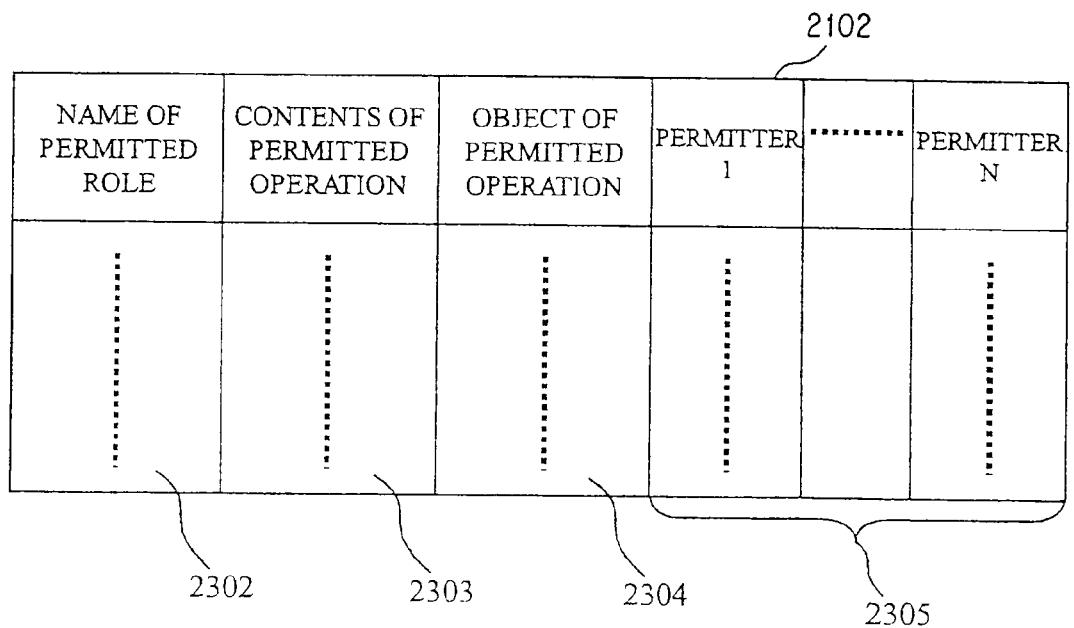
FIG. 23 is a diagram showing a configurational example of an access control policy according to the second embodiment.
Figure 26:
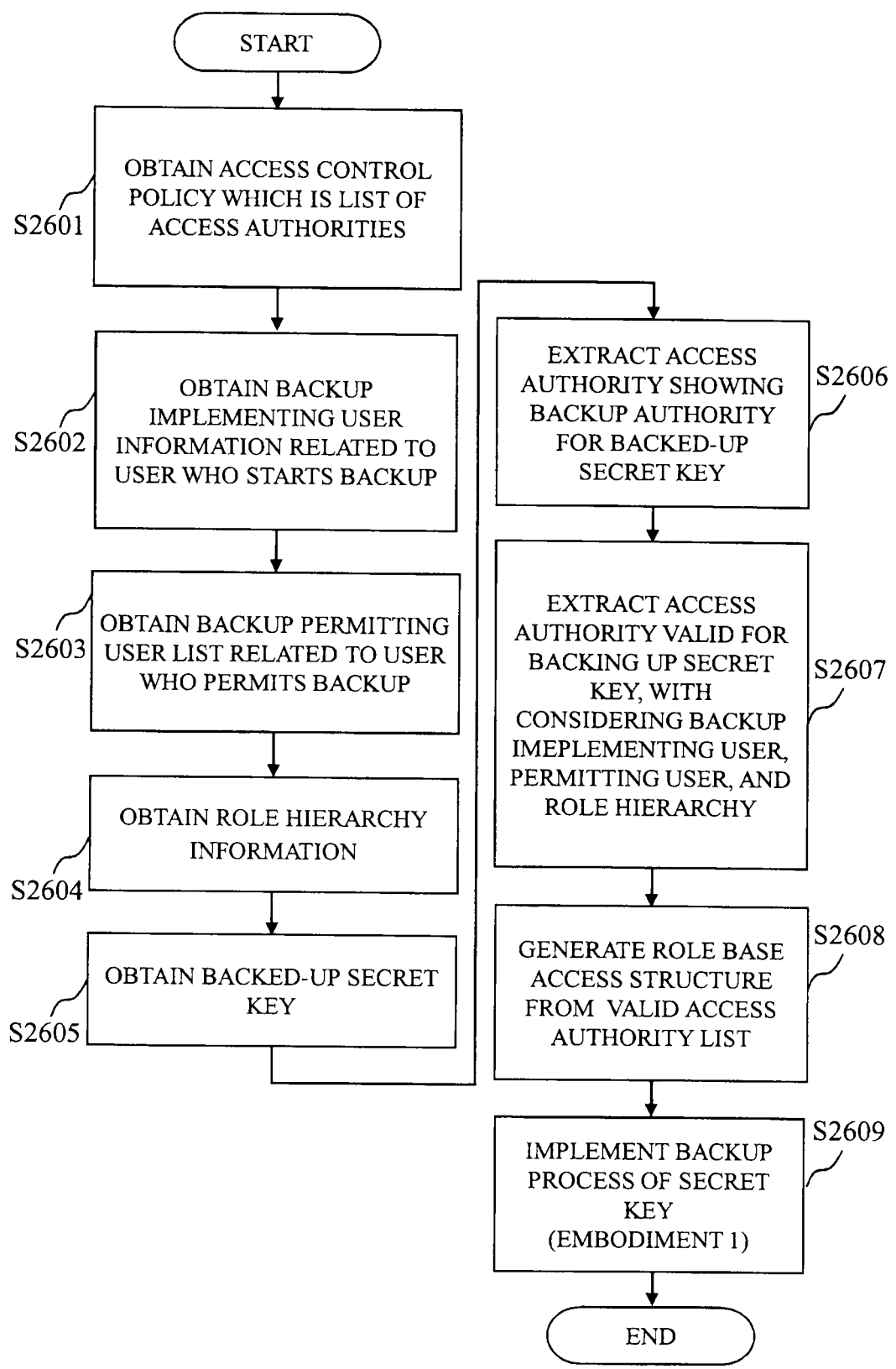
FIG. 26 is a flowchart showing a secret key backup system according to the second embodiment.

101: a secret key backup apparatus; 102: a backup participating user list obtaining unit; 103: a role base access structure obtaining unit; 104: a role hierarchy information obtaining unit; 105: a simultaneous validation prohibited role combination obtaining unit; 106: a backed-up secret key obtaining unit; 107: an all combination generating unit; 108: a same user/role deleting unit; 109: a simultaneous validation prohibited role deleting unit; 110: a role information deleting unit; 111: a redundant user information standardizing unit; 112: a redundant combination deleting unit; 113: an invalidated combination deleting unit; 114: a general access structure secret distributing unit; 2101: a role base access structure generating apparatus; 2102: an access control policy; 2103: backup implementing user information; 2104: a backup permitting user list; 2105: an access control policy obtaining unit; 2106: a backup implementing user information obtaining unit; 2107: a backup permitting user list obtaining unit; 2108: a backup authority extracting unit; 2109: a valid access authority extracting unit; 2110: a role base access structure generating unit; and 3000: a secret key backup system.

The invention claimed is:

1. A secret information management apparatus extracting a combination of users who become administrators of two or more pieces of divided secret information to be divided from an original set of secret information, the combination of users selected out of a plurality of users, the secret information management apparatus comprising:
a user role information obtaining unit for obtaining user role information showing a role possessed by each of the plurality of users;
a specified role information obtaining unit for obtaining specified role information showing two or more roles as a specified role; and
a user extracting unit for comparing the role of each user shown in the user role information with each specified role shown in the specified role information, extracting a user possessing a role matched for each specified role, combining users extracted according to a combination of specified roles, wherein the combination of specified roles is based on inclusion, exclusion or hierarchy rules, and generating the combination of users who become administrators of divided secret information based on the combination of specified roles, the combination being at least two users who will share the original set of secret information such that the original set of secret information cannot be reconstructed unless all of the users in the combination of users provide their pieces of divided secret information.

2. The secret information management apparatus of claim 1, wherein the specified role information obtaining unit sometimes obtains specified role information which redundantly shows a same role for at least two specified roles, and wherein the user extracting unit, when the specified role information redundantly shows the same role, extracts a user for each of at least two specified roles which are the same role, and as well excludes a combination in which a same user is assigned to each of at least two specified roles which are the same role from the combination of users who become the administrators of the divided secret information.

3. The secret information management apparatus of claim 1, wherein the user role information obtaining unit sometimes obtains user role information showing a user having two or more roles, wherein the secret information management apparatus further comprises a simultaneous combination prohibited role information obtaining unit for obtaining simultaneous combination prohibited role information showing two or more roles to which assignment of a same user is prohibited as simultaneous combination prohibited roles; and wherein the user extracting unit extracts a user for each specified role, and as well excludes a combination in which a same user is assigned to at least two specified roles corresponding to the simultaneous combination prohibited roles out of the combinations of users who become administrators of the divided secret information.

4. The secret information management apparatus of claim 1, wherein the user role information obtaining unit sometimes obtains user role information showing a user possessing an upper level role including one or more other roles as lower level roles, wherein the secret information management apparatus further comprises an inclusion relationship information obtaining unit for obtaining inclusion relationship information showing inclusion relationship of the upper level role and the lower level roles, and wherein the user extracting unit, based on the inclusion relationship shown in the inclusion relationship information, when either of the lower level roles is specified as the specified role in the specified role information, derives an upper level role of the lower level role which is the specified role, extracts a user possessing a role which matches the lower level role which is the specified role, and as well extracts a user possessing a role which matches the upper level role of the lower level role which is the specified role by relating to the lower level role.

5. The secret information management apparatus of claim 4, further comprising a simultaneous combination prohibited role information obtaining unit for obtaining simultaneous combination prohibited role information showing two or more roles to which assignment of a same user is prohibited as simultaneous combination prohibited roles, wherein the user extracting unit, when the lower level role is included in the simultaneous combination prohibited roles, excludes a combination in which a same user is assigned to the upper level role of the lower level role included in the simultaneous combination prohibited roles and either of other specified roles included in the simultaneous combination prohibited roles out of the combinations of users who become the administrators of the divided secret information.

6. The secret information management apparatus of claim 1, further comprising a secret information dividing unit for generating divided secret information based on the combination of users who become the administrators of the divided secret information generated by the user extracting unit.

7. The secret information management apparatus of claim 1, wherein the user extracting unit generates combination extracted information showing the combination of users generated together with a role possessed by each user, wherein the secret information management apparatus further comprises: a role information deleting unit for deleting information of the role of each user from the combination extracted information; a redundant user information standardizing unit, when there exists a combination in which same users are redundantly combined in the combination extracted information, for removing redundancy of the users from the combination; a redundant combination deleting unit, when there exist two or more combinations in which same users are combined with a different order describing the users in the combination extracted information, for removing a redundant combination; and an invalidated combination deleting unit, when any combination of users is included in another combination of users in the combination extracted information, for removing the combination which is included in the other combination.

8. An information processing apparatus comprising: an access control policy information obtaining unit for obtaining access control policy information showing a plurality of combinations of an implementer role which is permitted to access secret information, to which an access is limited, and one or more permitter roles which permit the implementer role to access the secret information, wherein the plurality of combinations are based on inclusion, exclusion or hierarchy rules;
an implementing user information obtaining unit for obtaining implementing user information showing one or more roles possessed by an implementing user who implements access to the secret information, as implementing user roles;
a permitting user information obtaining unit for obtaining permitting user information showing one or more roles possessed by a permitting user who permits the implementing user to access the secret information, as permitting user roles; and
a combination extracting unit for extracting a combination of which an implementer role matches the implementing user roles shown by the implementing user information and of which each permitter role matches either of the permitting user roles shown by the permitting user information out of the plurality of combinations shown by the access control policy information, the combination being at least two users who receive a piece of divided secret information such that the secret information cannot be reconstructed unless all of the users in the combination of users provide their respective piece of divided secret information.

9. The information processing apparatus of claim 8, wherein the implementing user information obtaining unit sometimes obtains implementing user information showing an upper level role including one or more other roles as lower level roles, as the implementing user roles, wherein the information processing apparatus further comprises an inclusion relationship information obtaining unit for obtaining inclusion relationship information showing inclusion relationship of the upper level role and the lower level roles, and wherein the combination extracting unit, based on the inclusion relationship shown by the inclusion relationship information, determines if the implementer role corresponds to the lower level role of the implementing user role or not, and when the implementer role corresponds to the lower level role of the implementing user role, determines if each of the permitter roles which are combined with the implementer role matches either of the permitting user roles or not.

10. The information processing apparatus of claim 8, wherein the permitting user information obtaining unit sometimes obtains permitting user information showing an upper level role including one or more other roles as lower level roles, as the permitting user roles, wherein the information processing apparatus further comprises an inclusion relationship information obtaining unit for obtaining inclusion relationship information showing inclusion relationship of the upper level role and the lower level roles, and wherein the combination extracting unit, based on the inclusion relationship shown by the inclusion relationship information, determines if each of the permitter role corresponds to the lower level roles of the permitting user role or not, and extracts a combination of which at least a part of all permitter roles corresponds to the lower level roles of the permitting user role and remaining permitter roles match the permitting user role.

11. The information processing apparatus of claim 8, wherein the combination extracting unit, based on roles shown by the combination extracted, generates specified role information showing roles of administrators of two or more pieces of divided secret information divided from the secret information, as a specified role.

12. An information processing apparatus comprising: an access control policy information obtaining unit for obtaining access control policy information showing a plurality of combinations of an implementer role which is permitted to access secret information, to which an access is limited, and one or more permitter roles which permit the implementer role to access the secret information, wherein the plurality of combinations are based on inclusion, exclusion or hierarchy rules;

an implementing user information obtaining unit for obtaining implementing user information showing one or more roles possessed by the implementing user who implements access to the secret information, as implementing user roles;

a permitting user information obtaining unit for obtaining permitting user information showing one or more roles possessed by a permitting user who permits the implementing user to access the secret information, as permitting user roles; and a combination extracting unit for extracting a combination of which an implementer role and each permitter role match either of the implementing user roles shown by the implementing user information and the permitting user roles shown by the permitting user information out of the plurality of combinations shown by the access control policy information, the combination being at least two users who receive a piece of divided secret information such that the secret information cannot be reconstructed unless all of the users in the combination of users provide their respective piece of divided secret information.

13. The information processing apparatus of claim 12, wherein the implementing user information obtaining unit sometimes obtains implementing user information showing an upper level role including one or more other roles as lower level roles, as the implementing user roles, wherein the permitting user information obtaining unit sometimes obtains permitting user information showing an upper level role including one or more other roles as lower level roles, as the permitting user roles, wherein the information processing apparatus further comprises an inclusion relationship information obtaining unit for obtaining inclusion relationship information showing inclusion relationship of the upper level role and the lower level roles, and wherein the combination extracting unit, based on the inclusion relationship shown by the inclusion relationship information, determines if the implementer role and each permitter role correspond to either of the lower level roles of the implementing user role and the lower level roles of the permitting user role or not, and extracts a combination of which at least a part of the implementer role and the all permitter roles correspond to either of the lower level roles of the implementing user role and the lower level roles of the permitting user role, and remains of the implementer role and the all permitter roles match either of the implementing user roles and the permitting user role.

14. A secret information management system comprising:
an access control policy information obtaining unit for obtaining access control policy information showing a plurality of combinations of an implementer role which is permitted to access secret information, to which an access is limited, and one or more permitter roles which permit the implementer role to access the secret information, wherein the plurality of combinations are based on inclusion, exclusion or hierarchy rules;

an implementing user information obtaining unit for obtaining implementing user information showing one or more roles possessed by the implementing user who implements access to the secret information, as implementing user roles;

a permitting user information obtaining unit for obtaining permitting user information showing one or more roles possessed by a permitting user who permits the implementing user to access the secret information, as permitting user roles;

a combination extracting unit for extracting a combination of which an implementer role matches the implementing user roles shown by the implementing user information and of which each permitter role matches either of the permitting user roles shown by the permitting user information out of the plurality of combinations shown by the access control policy information, and for generating specified role information showing roles of administrators of two or more pieces of divided secret information divided from the secret information, as a specified role based on roles shown by the combination extracted;

a user role information obtaining unit for obtaining user role information showing a role possessed by each of a plurality of users;

a specified role information obtaining unit for obtaining the specified role information generated by the combination extracting unit;

a user extracting unit for comparing the role of each user shown by the user role information with each of the specified role shown by the specified role information, extracting a user possessing a role matched for each of the specified role, combining users extracted according to a combination of the specified roles, and generating a combination of users who become administrators of divided secret information; and a secret information dividing unit for generating divided secret information based on the combination of users who become the administrators of the divided secret information generated by the user extracting unit, the combination being at least two users who receive a piece of the divided secret information such that the secret information cannot be reconstructed unless all of the users in the combination of users provide their respective piece of the divided secret information.

15. A secret information management system comprising:
an access control policy information obtaining unit for obtaining access control policy information showing a plurality of combinations of an implementer role which is permitted to access secret information, to which an access is limited, and one or more permitter roles which permit the implementer role to access the secret information, wherein the plurality of combinations are based on inclusion, exclusion or hierarchy rules;

an implementing user information obtaining unit for obtaining implementing user information showing one or more roles possessed by the implementing user who implements access to the secret information, as implementing user roles;

a permitting user information obtaining unit for obtaining permitting user information showing one or more roles possessed by a permitting user who permits the implementing user to access the secret information, as permitting user roles;

a combination extracting unit for extracting a combination of which an implementer role and each permitter role match either of the implementing user roles shown by the implementing user information and the permitting user roles shown by the permitting user information out of the plurality of combinations shown by the access control policy information, and for generating specified role information showing roles of administrators of two or more pieces of divided secret information divided from the secret information, as a specified role based on roles shown by the combination extracted;

a user role information obtaining unit for obtaining user role information showing a role possessed by each of a plurality of users;

a specified role information obtaining unit for obtaining the specified role information generated by the combination extracting unit;

a user extracting unit for comparing the role of each user shown by the user role information with each of the specified role shown by the specified role information, extracting a user possessing a role matched for each of the specified role, combining users extracted according to a combination of the specified roles, and generating a combination of users who become administrators of divided secret information; and a secret information dividing unit for generating divided secret information based on the combination of users who become the administrators of the divided secret information generated by the user extracting unit, the combination being at least two users who receive a piece of divided secret information such that the secret information cannot be reconstructed unless all of the users in the combination of users provide their respective piece of divided secret information.

* * * * *